US011838656B2

(12) United States Patent
Takeda

(10) Patent No.: US 11,838,656 B2
(45) Date of Patent: Dec. 5, 2023

(54) IMAGING DEVICE AND CORRECTION METHOD FOR REDUCING IMAGE HEIGHT DEPENDENCY OF A DEPTH

(71) Applicant: SONY SEMICONDUCTOR SOLUTIONS CORPORATION, Kanagawa (JP)

(72) Inventor: Tomoya Takeda, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 334 days.

(21) Appl. No.: 17/250,674

(22) PCT Filed: Aug. 21, 2019

(86) PCT No.: PCT/JP2019/032708
§ 371 (c)(1),
(2) Date: Feb. 18, 2021

(87) PCT Pub. No.: WO2020/045202
PCT Pub. Date: Mar. 5, 2020

(65) Prior Publication Data
US 2022/0353424 A1 Nov. 3, 2022

(30) Foreign Application Priority Data
Aug. 31, 2018 (JP) ................... 2018-162707

(51) Int. Cl.
*H04N 23/959* (2023.01)
*G06T 7/50* (2017.01)
(52) U.S. Cl.
CPC ............. *H04N 23/959* (2023.01); *G06T 7/50* (2017.01)

(58) Field of Classification Search
CPC .. H04N 23/959; H04N 23/672; H04N 23/676; H04N 2013/0081; G06T 7/50; G06T 2207/10024; G06T 2207/10068; G06T 5/006; G01C 3/06; G02B 7/34; G03B 13/36
See application file for complete search history.

(56) References Cited

U.S. PATENT DOCUMENTS

| | | | |
|---|---|---|---|
| 10,417,781 B1* | 9/2019 | Konolige | G06V 10/82 |
| 2017/0322023 A1* | 11/2017 | Ikemoto | H04N 23/672 |
| 2018/0164832 A1* | 6/2018 | You | G05D 1/0251 |
| 2020/0043192 A1* | 2/2020 | Zhang | G06V 20/64 |

FOREIGN PATENT DOCUMENTS

| | | |
|---|---|---|
| JP | 2012-128101 A | 7/2012 |
| JP | 2015-031754 A | 2/2015 |

OTHER PUBLICATIONS

International Search Report and Written Opinion of PCT Application No. PCT/JP2019/032708, dated Sep. 24, 2019, 08 pages of ISRWO.

* cited by examiner

*Primary Examiner* — Hung H Lam
(74) *Attorney, Agent, or Firm* — CHIP LAW GROUP

(57) ABSTRACT

An imaging device (100) includes: an imaging element (112) including a pixel capable of detecting a depth; an image processing unit (120) configured to detect a depth using a signal obtained from the pixel and perform processing based on the depth; and a correction data generation unit (130) configured to generate, based on the signal, a correction map for correcting image height dependency of the depth in the image processing unit (120).

9 Claims, 40 Drawing Sheets

FIG. 3
INPUT IMAGE
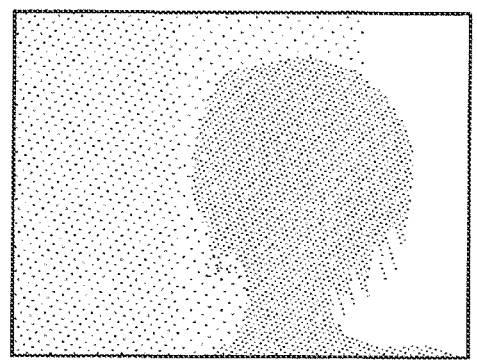
DEPTH MAP
(BLACK AS BEING CLOSER,
WHITE AS BEING FARTHER AWAY)

FIG. 5
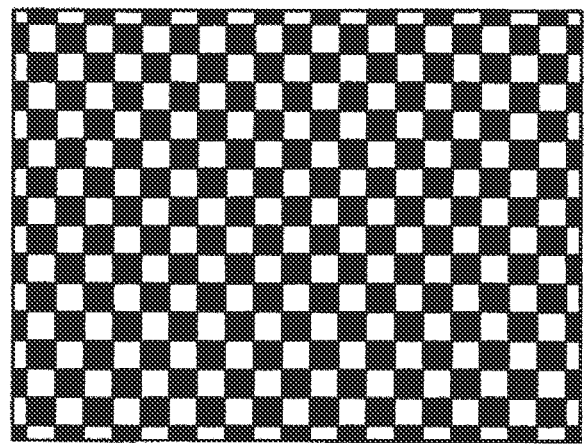
INPUT IMAGE
(PLATE WITH CHECKERED PATTERN)
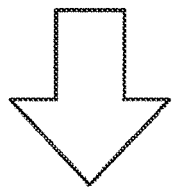
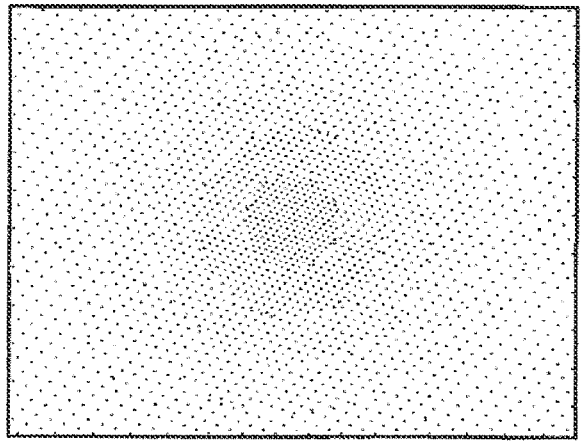
DEPTH MAP
(BLACK AS BEING CLOSER,
WHITE AS BEING FARTHER AWAY)

IMAGING DEVICE AND CORRECTION METHOD FOR REDUCING IMAGE HEIGHT DEPENDENCY OF A DEPTH

CROSS REFERENCE TO RELATED APPLICATIONS

This application is a U.S. National Phase of International Patent Application No. PCT/JP2019/032708 filed on Aug. 21, 2019, which claims priority benefit of Japanese Patent Application No. JP 2018-162707 filed in the Japan Patent Office on Aug. 31, 2018. Each of the above-referenced applications is hereby incorporated herein by reference in its entirety.

TECHNICAL FIELD

The present disclosure relates to an imaging device, a correction method, and a computer program.

BACKGROUND ART

In video cameras, digital still cameras, and the like, semiconductor imaging devices including imaging devices such as charge coupled devices (CCDs) or complementary metal-oxide semiconductors (CMOSs) are used. In the imaging devices, a light reception unit including a photodiode is formed for each element and the light reception unit photoelectrically converts incident light to generate signal charges.

In recent years, a scheme (an image surface phase difference detection scheme) of detecting a phase using some of imaging pixels in an imaging device and speeding up autofocus (AF) has been developed. The phase difference detection method is a scheme of performing focus detection of a pupil division method using a two-dimensional sensor in which an on-chip lens is provided in each pixel of an imaging element. A pixel provided below the on-chip lens is called a pupil division pixel. By using an image generated by the pupil division pixels, distance information of a subject in the image can be obtained as a depth map.

CITATION LIST

Patent Literature

[PTL 1]
JP 2012-128101A

SUMMARY

Technical Problem

When depth detection is performed using pupil division pixels, image height dependency of a depth arises due to a curved shape of the lens or lens mount shift. That is, even when a subject which is at the same distance is at a different image height, a phenomenon in which a depth detected from the subject differs is observed.

In PTL 1 above, a lens position which is in focus (focused) is found by contrast autofocus (AF), and a phase difference at the position is used as an offset shift. An objective disposed in PTL 1 is to improve a phase difference AF and only an offset shift is corrected. Therefore, a shift amount of the phase difference arising when a lens position is changed is not corrected. As a result, a variation in an in-plane depth in the depth map cannot be corrected.

Accordingly, the present disclosure provides a novel and improved imaging device, correction method, and computer program capable of reducing image height dependency of a depth detected by a sensor that has pixels capable of detecting a depth.

Solution to Problem

According to the present disclosure, an imaging device includes: an imaging element including a pixel capable of detecting a depth; an image processing unit configured to detect a depth using a signal obtained from the pixel and perform processing based on the depth; and a correction data generation unit configured to generate correction data for correcting image height dependency of the depth in the image processing unit based on the signal.

According to the present disclosure, a correction method includes: using a processor, detecting a depth using a signal obtained from an imaging element including a pixel capable of detecting a depth and performing processing based on the depth; and generating correction data for correcting image height dependency of the detected depth based on the signal.

According to the present disclosure, a computer program causes a computer to perform: detecting a depth using a signal obtained from an imaging element including a pixel capable of detecting a depth and performing processing based on the depth; and generating correction data for correcting image height dependency of the detected depth based on the signal.

Advantageous Effects of Invention

As described above, the present disclosure provides a novel and improved imaging device, correction method, and computer program capable of reducing image height dependency of a depth detected by a sensor that has pixels capable of detecting a depth.

The foregoing advantageous effects are not necessarily restrictive and any advantageous effect described in the present specification or other advantageous effects ascertained in the present specification can be obtained in addition to the foregoing advantageous effects or instead of the foregoing advantageous effects.

BRIEF DESCRIPTION OF DRAWINGS

FIG. 3 is an explanatory diagram illustrating examples of an image generated by an image sensor and a depth map generated from the image.

FIG. 5 is an explanatory diagram illustrating image height dependency of a depth.

DESCRIPTION OF EMBODIMENTS

Figure 1:
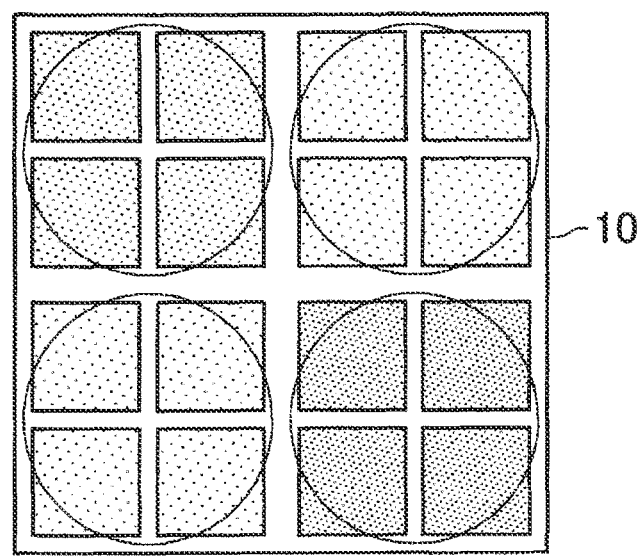
FIG. 1 is an explanatory diagram illustrating an example of pupil division pixels.

Hereinafter, preferred embodiments of the present disclosure will be described in detail with reference to the appended figures. In the present specification and the figures, the same reference numerals are given to constituent elements that have substantially the same functional configurations and description thereof will be omitted.

Description will be made in the following order.
1. Embodiment of present disclosure
1.1. Circumstances
1.2. Configuration examples
1.3. Operation examples
2. Conclusion
3. Example of application to imaging element
4. Example of application to moving body
5. Example of application to endoscope surgery system 1. Embodiment of Present Disclosure

[1.1. Circumstances]

First, circumstances leading to embodiments of the present disclosure will be described. As described above, distance information of a subject in an image can be obtained as a depth map by using an image generated by pupil division pixels. FIG. 1 is an explanatory diagram illustrating an example of pupil division pixels. The pupil division pixels are a plurality of pixels corresponding to one on-chip lens 10. In FIG. 1, there are four pupil division pixels in one on-chip lens 10, but the number of pupil division pixels per on-chip lens is not limited to this example.

For example, when there are four pupil division pixels per on-chip lens as in FIG. 1 and the pupil division pixels used to generate an image are set to be different on the upper and lower sides or the right and left sides, a shift amount of a subject in the image changes in accordance with a distance from an image sensor. That is, a shift amount is zero at a position which is in focus (a focus position), and a shift amount increases as a distance from the focus position increases.

FIGS. 2A, 2B, 2C, and 2D are explanatory diagrams illustrating an example of an image generated from the pupil division pixels. FIGS. 2A, 2B, 2C, and 2D illustrate an example of an image obtained by imaging a checkered pattern board and a figure placed in front of the board using the pupil division pixels. A focus is adjusted so that the image is in focus slightly behind in the checkered pattern board.

Figure 2A:
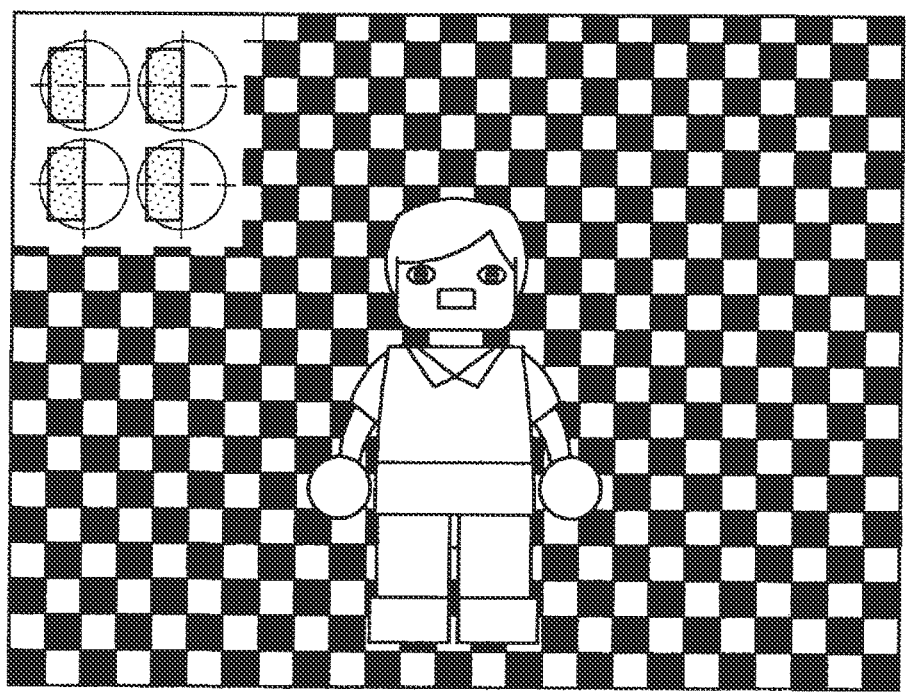
FIG. 2A is an explanatory diagram illustrating an example of an image generated from the pupil division pixels.
Figure 2B:
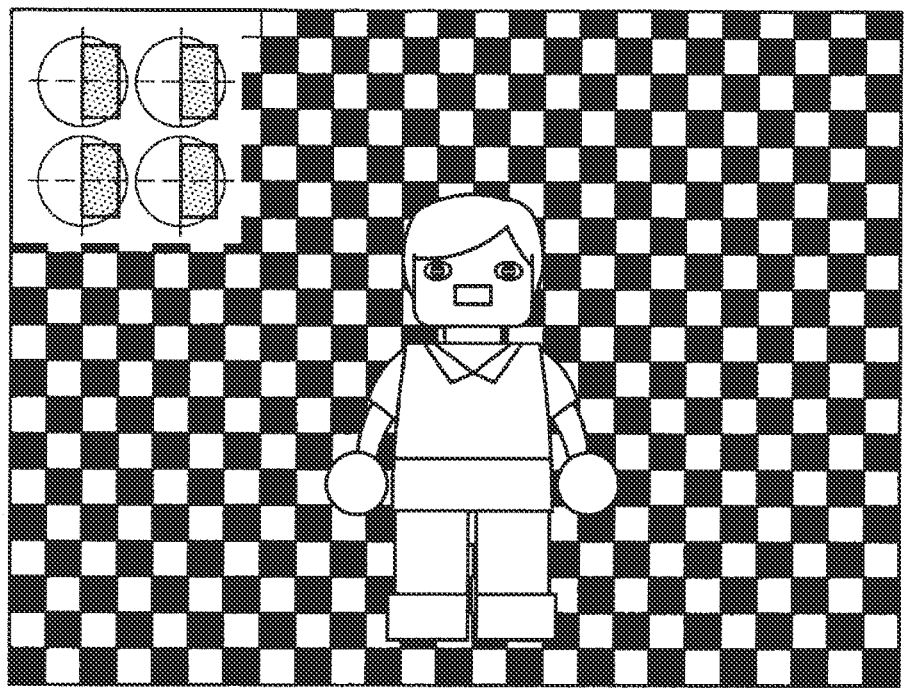
FIG. 2B is an explanatory diagram illustrating an example of an image generated from the pupil division pixels.

FIG. 2A illustrates an example of an image generated with two left pixels among the four pupil division pixels. FIG. 2B illustrates an example of an image generated with two right pixels among the four pupil division pixels. When the pupil division pixels used to generate the image are switched, as illustrated in FIGS. 2A and 2B, the plate in the checkered pattern which is not very far from the focus position does not shifted every much, but the figure placed in front of the plate and farther from the focus position is relatively greatly shifted.

Figure 2C:
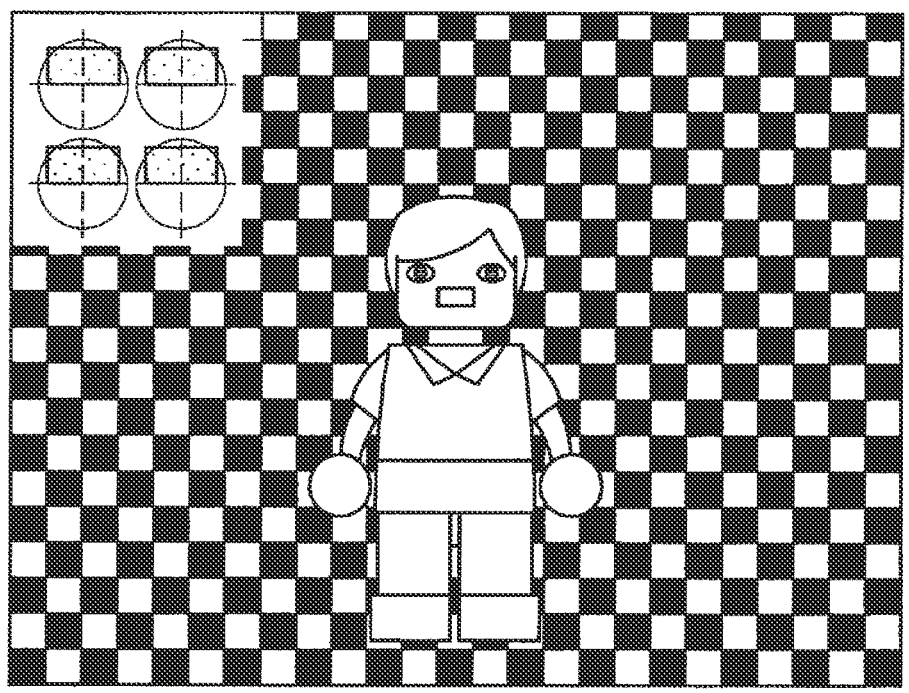
FIG. 2C is an explanatory diagram illustrating an example of an image generated from the pupil division pixels.
Figure 2D:
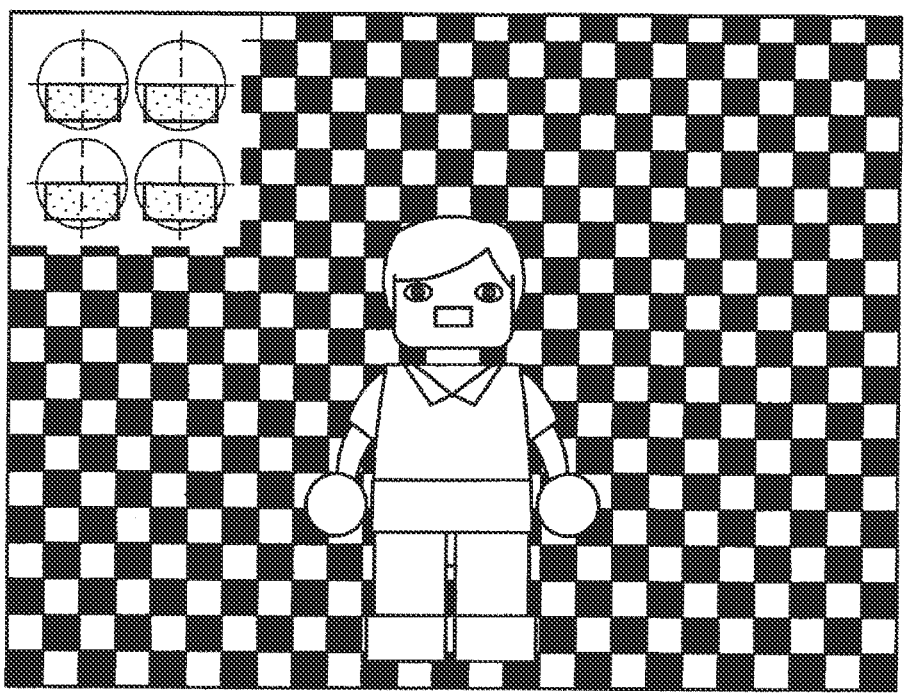
FIG. 2D is an explanatory diagram illustrating an example of an image generated from the pupil division pixels.

FIG. 2C illustrates an example of an image generated with two lower pixels among the four pupil division pixels. FIG. 2D illustrates an example of an image generated with two upper pixels among the four pupil division pixels. When the pupil division pixels used to generate the image are switched, as illustrated in FIGS. 2C and 2D, the plate in the checkered pattern which is not very far from the focus position is not every shifted, but the figure placed in front of the plate and farther from the focus position is relatively greatly shifted.

By using the shift amount, it is possible to calculate a distance (a depth) from an image sensor to the subject.

A depth map is an image formed using a distance from the image sensor to a subject. An example of a depth map is a depth map in which a subject has a perspective in black and white shading. FIG. 3 is a diagram illustrating examples of an image generated by an image sensor and a depth map generated from the image. The depth map illustrated in FIG. 3 is an image in which an image is darker toward black as closer to the image sensor, and lighter toward white as farther away therefrom.

In this way, when depth detection is performed using the pupil division pixels, image height dependency of a depth arises due to a curved shape of the lens or lens mount shift. That is, even when a subject which is at the same distance is at a different image height, a phenomenon in which a depth detected from the subject differs is observed.

Figure 4:
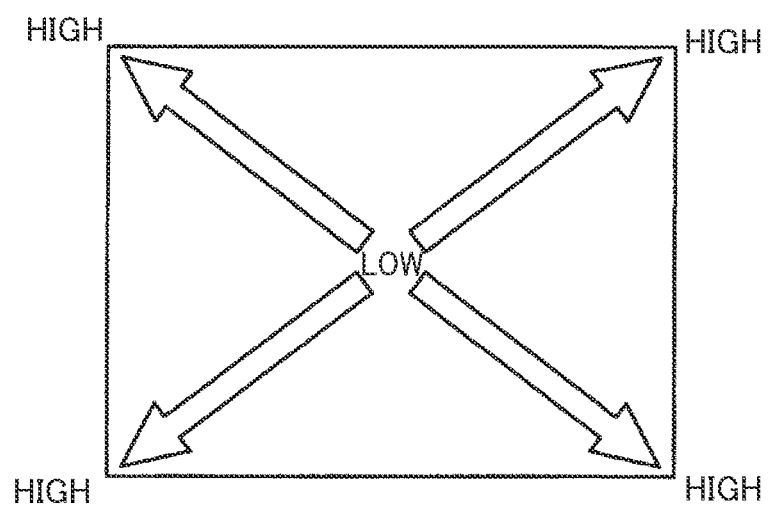
FIG. 4 is an explanatory diagram illustrating an image height.

An image height is a distance from an optical axis (for example, the center of an image). When the optical axis is at a center of an image, an image height of a central portion of the image is expressed as being low and an image height of an end portion of the image is expressed as being high. FIG. 4 is an explanatory diagram illustrating an image height. FIG. 4 illustrates an image height when the center of an image is an optical axis. An image height of a central portion of the image is low and an image height of an end portion of the image is high.

When a patterned plate is imaged, a distance from an image sensor is uniform without depending on an image height because the plate is flat. However, in a depth map obtained from an image captured from the plate, a phenomenon in which the value of a depth differs depending on an image height occurs. This phenomenon is called image height dependency of the depth. FIG. 5 is an explanatory diagram illustrating image height dependency of the depth. An example of a depth map obtained from an image captured from a patterned plate such as an image on the upper side of FIG. 5 is illustrated in the left lower side of FIG. 5. In this way, the phenomenon in which the value of the depth differs depending on an image height occurs. When the value of the depth differs depending on an image height, for example, an application that obtains a distance from the value of the depth may determine that a subject is at a different distance due to the image height even when the subject is at the same distance from the image sensor.

Figure 6:
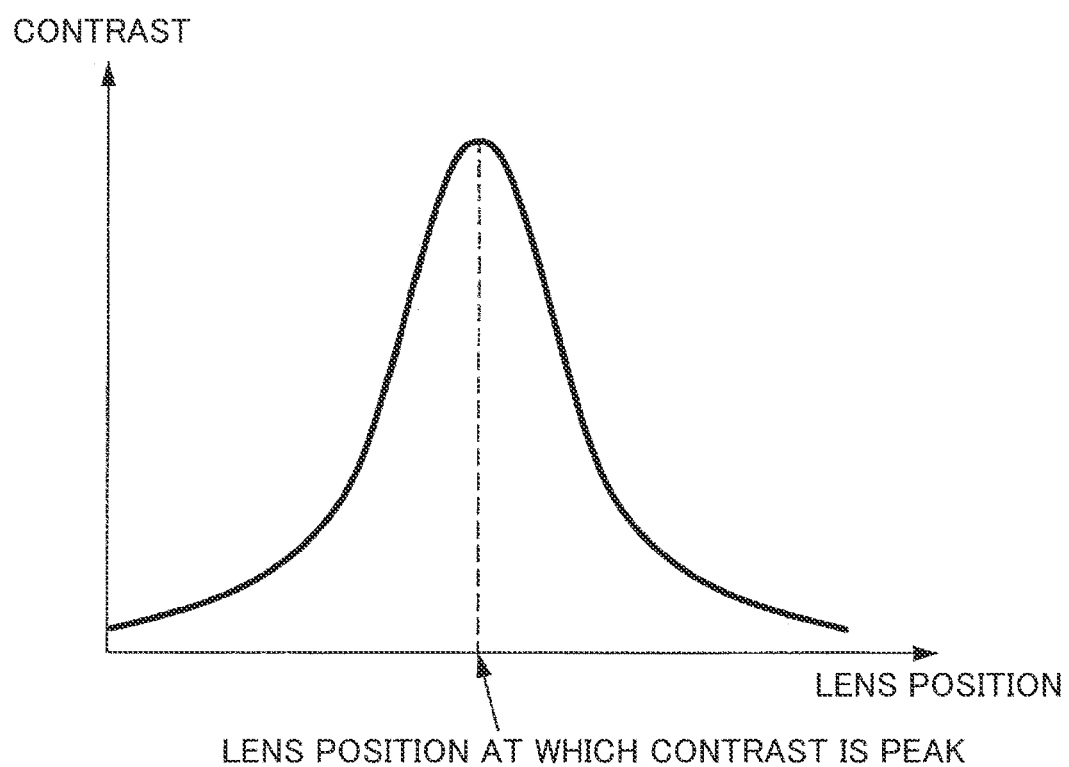
FIG. 6 is an explanatory diagram illustrating contrast AF.

Next, a technology for focusing a subject automatically will be described. As methods of focusing a subject automatically, there are contrast AF and phase difference AF. Contrast AF is a method of moving a position of a lens and finding the position of the lens at which a contrast of an image is a peak. FIG. 6 is an explanatory diagram illustrating contrast AF. In the graph of FIG. 6, the horizontal axis represents a lens position and the vertical axis represents the contrast of an image. In contrast AF, a lens position at which the contrast is the largest is a position at which a subject is in focus when a relation between a lens position and contrast is shown as in the graph of FIG. 6.

Figure 7:
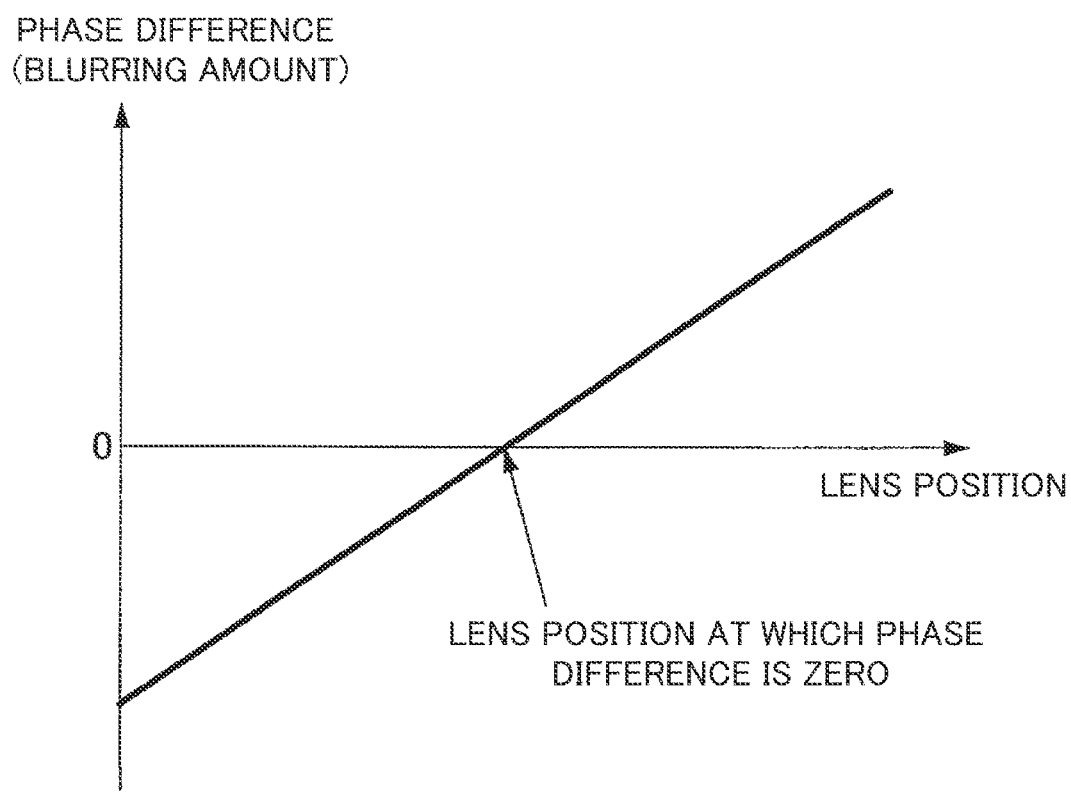
FIG. 7 is an explanatory diagram illustrating phase difference AF.

Phase difference AF is a method of moving the position of a lens and finding the position of the lens at which a phase difference (a blurring amount) of an image is zero. FIG. 7 is an explanatory diagram illustrating phase difference AF. In the graph of FIG. 7, the horizontal axis represents a lens position and the vertical axis represents a phase difference. In phase difference AF, a lens position at which the phase difference is zero is a position at which a subject is in focus when a relation between the lens position and the phase difference is shown in the graph of FIG. 7.

Figure 8:
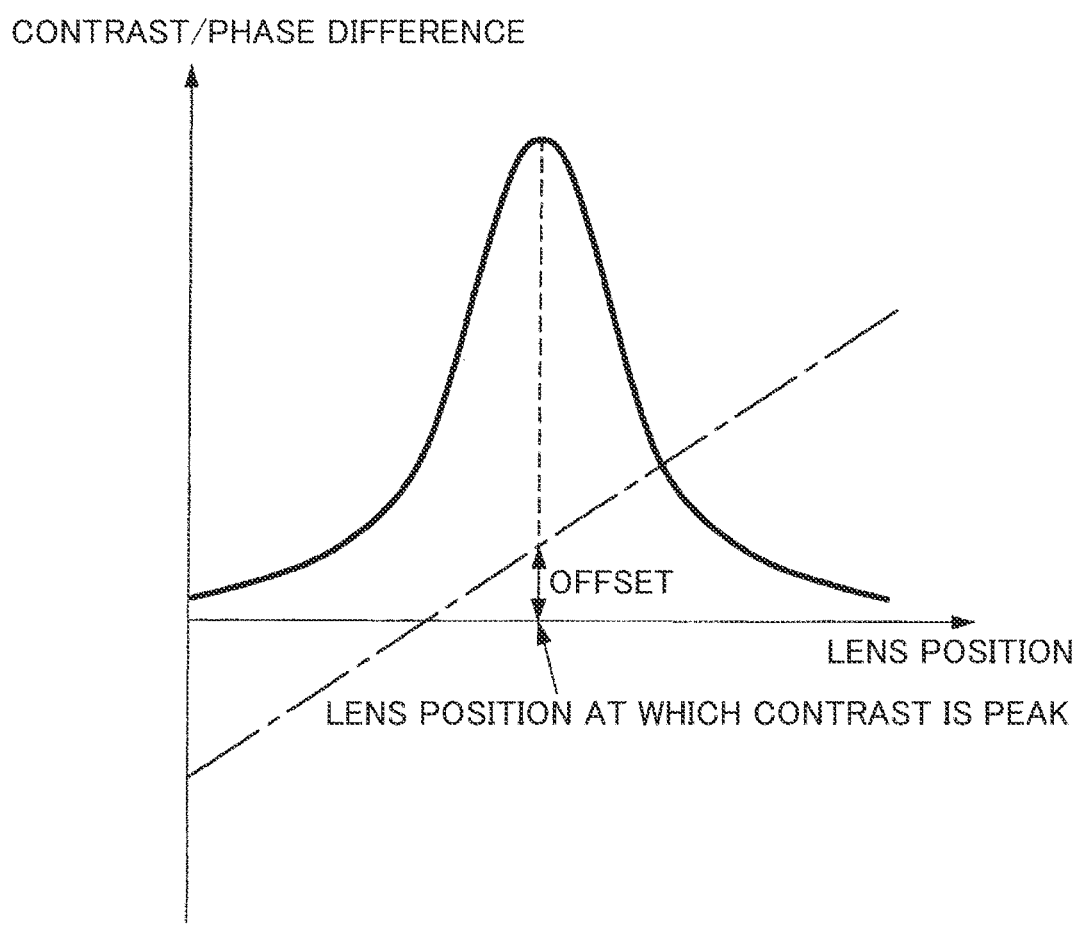
FIG. 8 is an explanatory diagram illustrating a technology in PTL 1.

When the phase difference AF is used, a phase difference is in principle 0 at an in-focus position, but in reality an offset may be multiplied. PTL 1 above discloses a technology for finding an in-focus lens position using the contract AF and correcting an offset using the value of a phase difference at that position as the offset. FIG. 8 is an explanatory diagram illustrating a technology in PTL 1 above. In the graph illustrated in FIG. 8, a solid line indicates a relation between a lens position and contrast and a one-dot dashed line indicates a relation between the lens position and a phase difference.

However, an objective disclosed in PTL 1 is to improve phase difference AF and only an offset shift is corrected. Therefore, a shift amount of the phase difference arising when a lens position is changed is not corrected. As a result, a variation in an in-plane depth in the depth map cannot be corrected.

Accordingly, those who disclosed the present specification have examined technologies capable of correcting a variation in an in-plane depth in a depth map in view of the above-described circumstances. As a result, those who disclosed the present specifications have devised a technology capable of correcting a variation in an in-plane depth in a depth map, as will be described below.

The circumstances leading to the embodiments of the present disclosure have been described. Next, the embodiments of the present disclosure will be described in detail.

[1.2. Configuration Examples]

Figure 9:
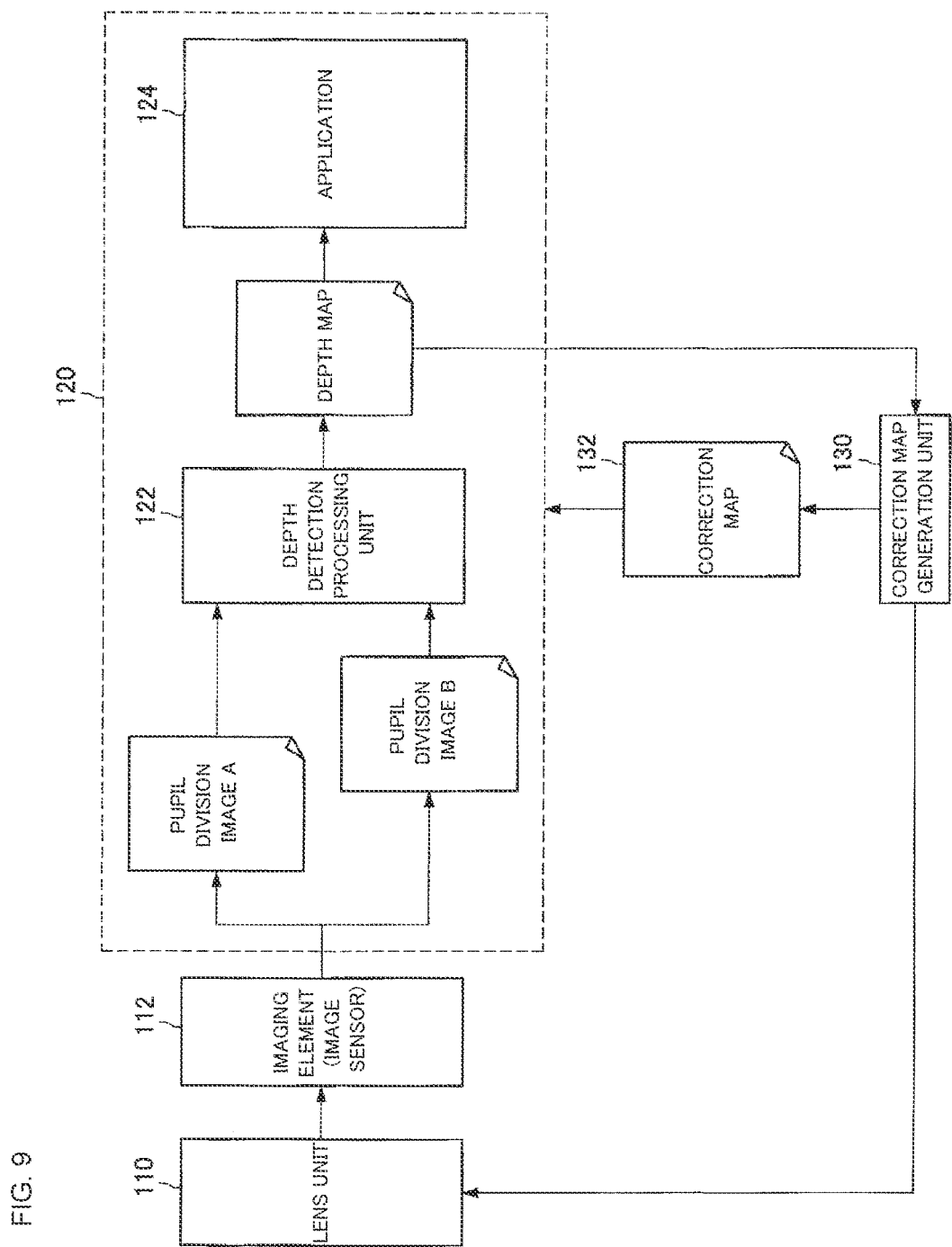
FIG. 9 is an explanatory diagram illustrating a functional configuration example of an imaging device according to an embodiment of the present disclosure.

First, a functional configuration example of an imaging device according to an embodiment of the present disclosure will be described. FIG. 9 is an explanatory diagram illustrating a functional configuration example of an imaging device 100 according to an embodiment of the present disclosure. Hereinafter, the functional configuration example of an imaging device 100 according to an embodiment of the present disclosure will be described with reference to FIG. 9.

As illustrated in FIG. 9, the imaging device 100 according to the embodiment of the present disclosure includes a lens unit 110, an imaging element 112, an image processing unit 120, and a correction map generation unit 130.

A lens group irradiating the imaging element 112 with light is disposed in the lens unit 110. In the embodiment, when the correction map generation unit 130 to be described below generates a correction map, the correction map generation unit 130 drives the lens unit 110 to move a lens position.

The imaging element 112 is configured as an image sensor which is configured to be able to detect a depth and in which a plurality of pixels correspond to one on-chip lens, as described above. The imaging element 112 generates image data from light radiated through the lens unit 110 and outputs the image data to the image processing unit 120 in a subsequent stage. In the embodiment, the imaging element 112 generates two pupil division images A and B and outputs the pupil division images A and B to the image processing unit 120. The pupil division images are images obtained by collecting the pupil division pixels. The pupil division images may be generated from the left and right pupil division pixels illustrated in FIGS. 2A and 2B or may be generated by the upper and lower pupil division pixels illustrated in FIGS. 2C and 2D. The pupil division images may be generated from a pair of diagonal pixels such as the upper right and lower left pixels or the upper left and lower right pixels among the four pupil division pixels illustrated in FIG. 1.

The image processing unit 120 performs image processing using the image data output from the imaging element 112. In the embodiment, the image processing unit 120 generates a depth map using the image data output from the imaging element 112 and performs processing using the depth map. As illustrated in FIG. 9, the image processing unit 120 includes a depth detection processing unit 122 that detects a depth of an image and generates a depth map and an application 124 that performs processing using the depth map generated by the depth detection processing unit 122.

The depth detection processing unit 122 detects a depth in an image using pupil division images A and B and generates a depth map. As described above, when the pupil division pixels used to generate an image are set to be different in the upper and lower directions, the left and right directions, or the diagonal directions, a shift amount of a subject in the image changes in accordance with a distance from the imaging element 112. That is, the shift amount of the subject which is in focus in the imaging element 112 becomes zero, and the shift amount of the subject away from the focus position of the imaging element 112 increases as a distance from the focus position increases. The depth detection processing unit 122 generates a depth map using information regarding a magnitude of the shift amount.

The application 124 performs various types of processing based on the depth map sent from the depth detection processing unit 122. Examples of the processing performed by the application 124 include autofocus processing, background blurring processing, distance measurement processing.

The image processing unit 120 may be configured as, for example, a general-purpose processor or may be configured as a processor specialized for image processing, such as an image processor or a graphic processor. The image processing unit 120 may include various memories in which an entity of the application 124 is stored.

The correction map generation unit 130 generates a correction map 132 for correcting the depth map generated by the image processing unit 120. The correction map 132 is an example of correction data according to the present disclosure and is correction data with a map format for correcting an image height dependency of the depth map. The correction map generation unit 130 functions as a correction data generation unit according to the present disclosure.

The correction map generation unit 130 uses data of the depth map at a plurality of lens positions when the correction map 132 is generated. Accordingly, the correction map generation unit 130 can have a function of driving the lens unit 110. The generation of the correction map 132 by the correction map generation unit 130 is assumed to be performed before shipment of a product and may also be performed, for example, when a user operates the imaging device 100.

The correction map generation unit 130 may be configured as, for example, a general-purpose processor or may be configured as a processor specialized for image processing, such as an image processor or a graphic processor.

The correction map 132 generated by the correction map generation unit 130 is used to correct the depth map. The depth detection processing unit 122 may output a depth map corrected using the correction map 132, the application 124 may correct the depth map generated by the depth detection processing unit 122 using the correction map 132, or the correction map 132 may be applied to a pupil division image output by the imaging element 112.

The fact that the depth detection processing unit 122 outputs the depth map corrected using the correction map 132 means that the image height dependency of the depth map is corrected in the middle of the depth detection processing of the depth detection processing unit 122.

The fact that the application 124 corrects the depth map generated by the depth detection processing unit 122 using the correction map 132 means that a parameter of an application in a subsequent stage is changed by an image height without correcting the image height dependency of the depth map generated by the depth detection processing unit 122.

The fact that the correction map 132 is applied to the pupil division image output by the imaging element 112 means that the pupil division image is corrected so that the image height dependency of a depth is reduced. Each scheme will be described in detail later.

Since the imaging device 100 according to the embodiment of the present disclosure has the configuration, it is able to generate a depth map in which the image height dependency of the depth is corrected.

The imaging device 100 illustrated in FIG. 9 detects the depth using the two pupil division images and generates the depth map, but the number of pupil division images for detecting the depth is not limited to this example.

The functional configuration example of the imaging device 100 according to the embodiment of the present disclosure has been described above. Next, an example of an operation of the imaging device 100 according to the embodiment of the present disclosure will be described.

[1.3. Operation Examples]

(1.3.1) Correction of Depth Map in Middle of Depth Detection Processing

First, an example of an operation of a case in which the image height dependency of the depth map is corrected in the middle of the depth detection processing of the depth detection processing unit 122 will be described. The depth detection processing unit 122 inputs a plurality of pupil division images and performs the depth detection processing using the pupil division images. At this time, the depth detection processing unit 122 corrects the image height dependency of the depth map by using the correction map 132 generated in advance. Methods of generating the correction map can be exemplified as follows.

Figure 10:
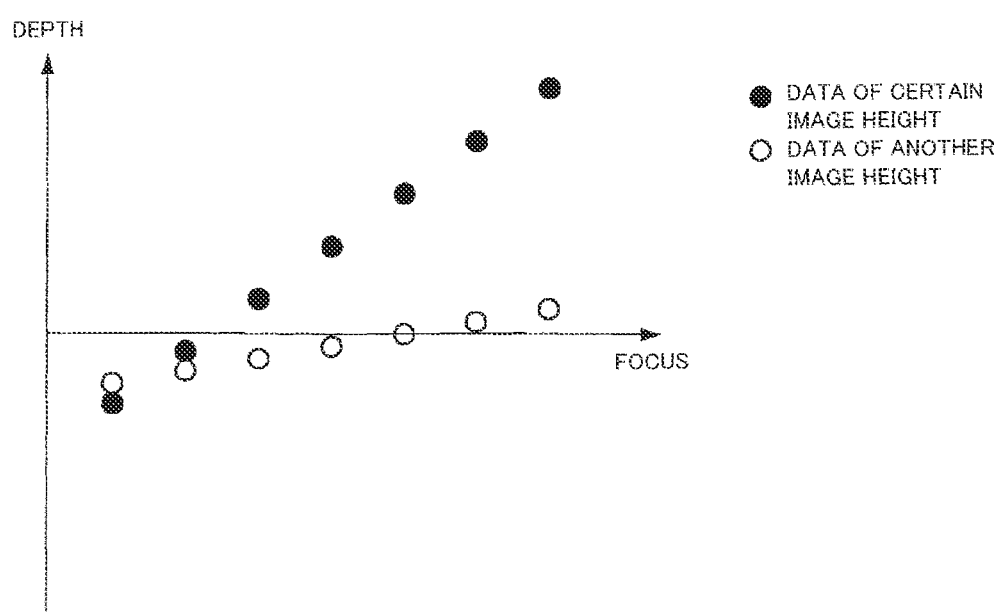
FIG. 10 is an explanatory diagram illustrating an example of a relation between a focus (lens positions) and a depth at a plurality of image heights.

(1) Imaging and Correction of Subject with Texture at Plurality of Lens Positions For example, a plate with texture (a checkered pattern, a ladder pattern, a random dot pattern, or the like) may be fixed and installed in front of the imaging device 100 and the imaging device 100 may generate the correction map through imaging at different focuses (lens positions). FIG. 10 is an explanatory diagram illustrating a relation example between the focus (lens positions) and the depth at a plurality of image heights. The imaging device 100 can obtain a plurality of pieces of data indicating the relation between the focus and the depth at all the image height positions. The imaging device 100 can acquire the correction map as follows, for example, by using the data.

The imaging device 100 can generate the correction map corresponding to each focus. When the correction processing is performed, the depth detection processing unit 122 can prepare the correction map corresponding to the focus at that time and performs calculation on each image height to reduce a variation in an image height of the depth.

Figure 11:
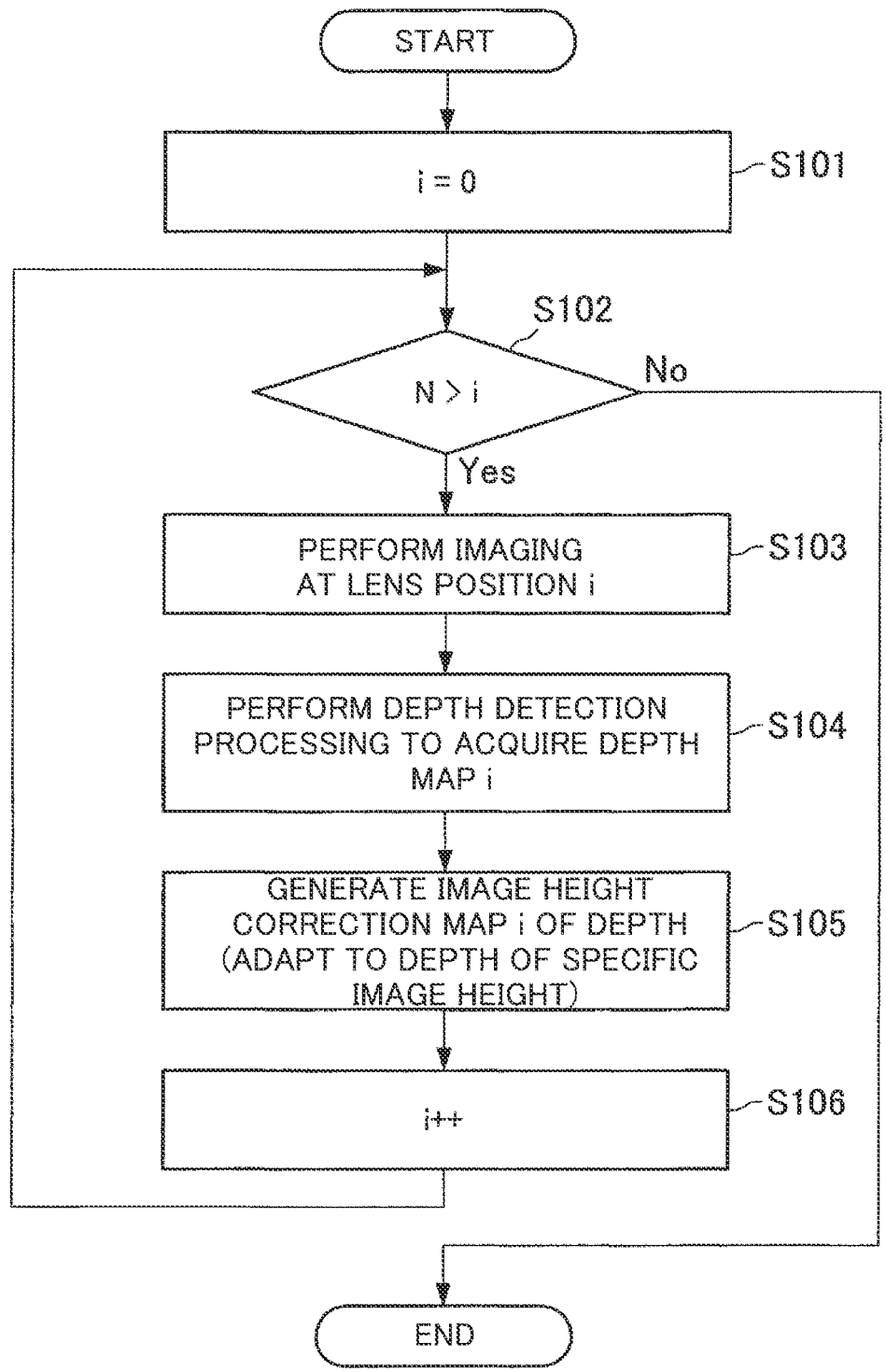
FIG. 11 is a flowchart illustrating an example of an operation of the imaging device according to the embodiment.

FIG. 11 is a flowchart illustrating an example of an operation of the imaging device 100 according to the embodiment and is a flowchart illustrating a generation example of a correction map corresponding to a plurality of focuses by the correction map generation unit 130.

The imaging device 100 first initializes a variable i to 0 (step S101). Subsequently, the imaging device 100 determines whether the variable i is less than a variable N indicating a desired number of depth maps (step S102). When i is less than N (Yes in step S102), the imaging device 100 moves the lens of the lens unit 110 and images the plate with the texture at the lens position i, as described above (step S103). The lens position i is an i-th lens position among a plurality of pre-decided lens positions at the time of generation of the correction map. The lens positions may be set at uniform intervals, but may not necessarily be set at uniform intervals.

Subsequently, the depth detection processing unit 122 of the imaging device 100 performs the depth detection processing using the image captured at the lens position i to acquire the depth map i (step S104). Then, the correction map generation unit 130 of the imaging device 100 generates the image height correction map i of the depth adapted to a depth of a specific image height (for example, an image height of the image middle) using the depth map i (step S105).

Thereafter, the imaging device 100 increments the variable i by one (step S106) and the process returns to the determination processing of step S102. When i is equal to or greater than N (No in step S102), the imaging device 100 ends the series of processing.

As in FIG. 10, the relation between the focus (the lens position) and the depth can be plotted and the points can be regressed to a polynomial of degree n (where n is an integer equal to or greater than 1). The imaging device 100 generates the correction map for performing calculation to reduce a variation in an image height of the polynomial of degree n. When the correction processing is performed, the depth detection processing unit 122 can acquire a correction value corresponding to a focus at the time of imaging from the correction map and perform the calculation on each image height to reduce the variation in the image height of the depth.

Figure 12:
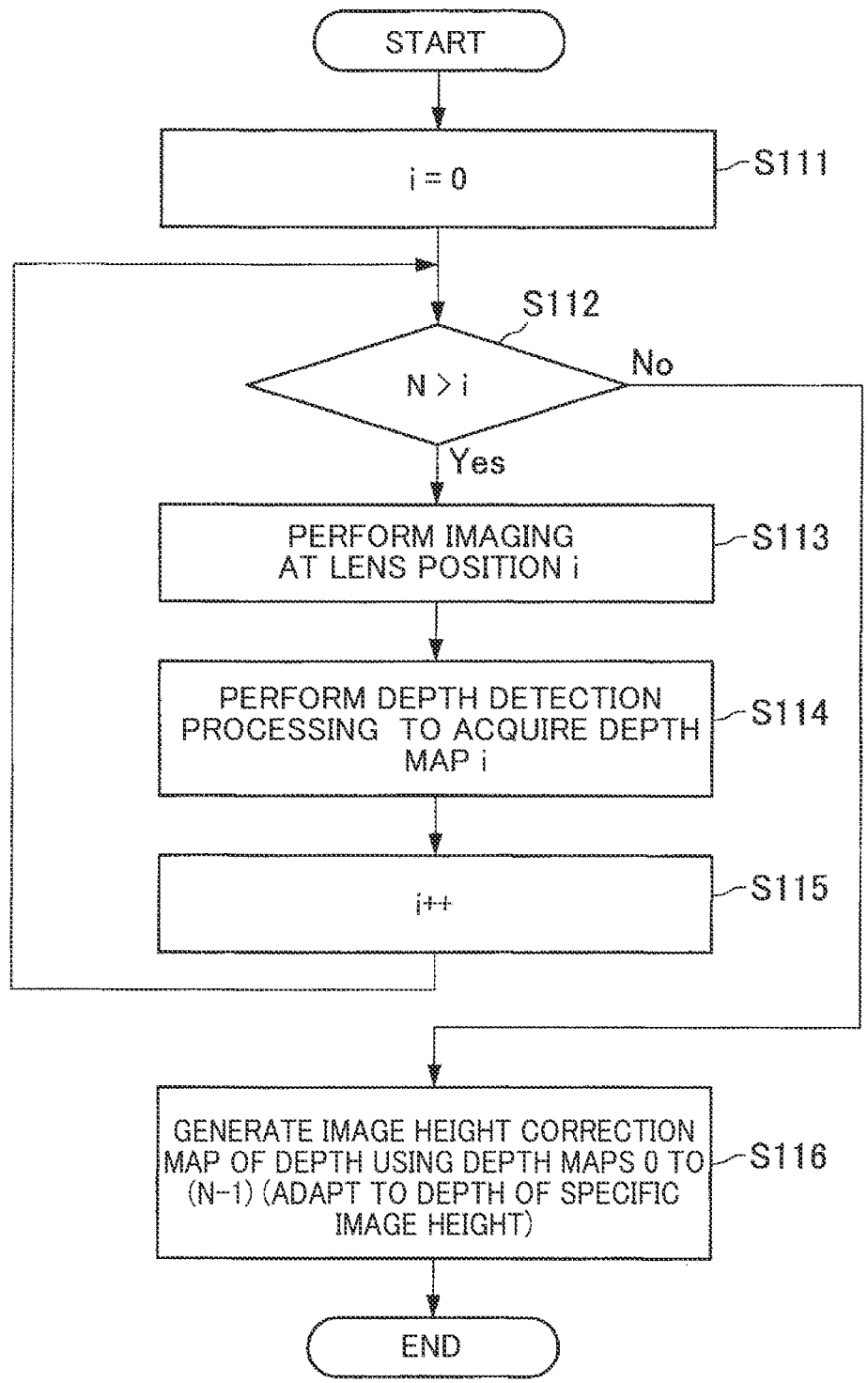
FIG. 12 is a flowchart illustrating an example of an operation of the imaging device according to the embodiment.

FIG. 12 is a flowchart illustrating an example of an operation of the imaging device 100 according to the embodiment and a flowchart illustrating a generation example of the correction map by the correction map generation unit 130.

The imaging device 100 first initializes the variable i to 0 (step S111). Subsequently, the imaging device 100 determines whether the variable i is less than the variable N indicating a desired number of depth maps (step S112). When i is less than N (Yes in step S112), the imaging device 100 images the plate with the texture at the lens position i, as described above (step S113).

Subsequently, the depth detection processing unit 122 of the imaging device 100 performs the depth detection processing using the image captured at the lens position i to acquire the depth map i (step S114). Subsequently, the imaging device 100 increments the variable i by one (step S115) and the process returns to the determination processing of step S112. When i is equal to or greater than N (No in step S112), the correction map generation unit 130 of the imaging device 100 generates the image height correction map of the depth adapted to a depth of a specific image height (for example, an image height of the image middle) using N depth maps (step S116).

(2) Imaging and Correction of Subject with Texture on One Focus

For example, a plate with texture may be fixed and installed in front of the imaging device 100 and the imaging device 100 may generate the correction map through imaging at one lens position (for example, an in-focus position). At the time of generation of the correction map, the imaging device 100 moves the lens to a position which is as close to in-focus as possible using the phase difference AF. The imaging device 100 generates a map in which an offset shift amount of the depth at each image height is maintained by calculating a difference between depth of an image height serving as a reference (for example, an image height center) and depth of each image height. The imaging device 100 can reduce the image height dependency of the depth by using this shift amount as a correction value.

Figure 13:
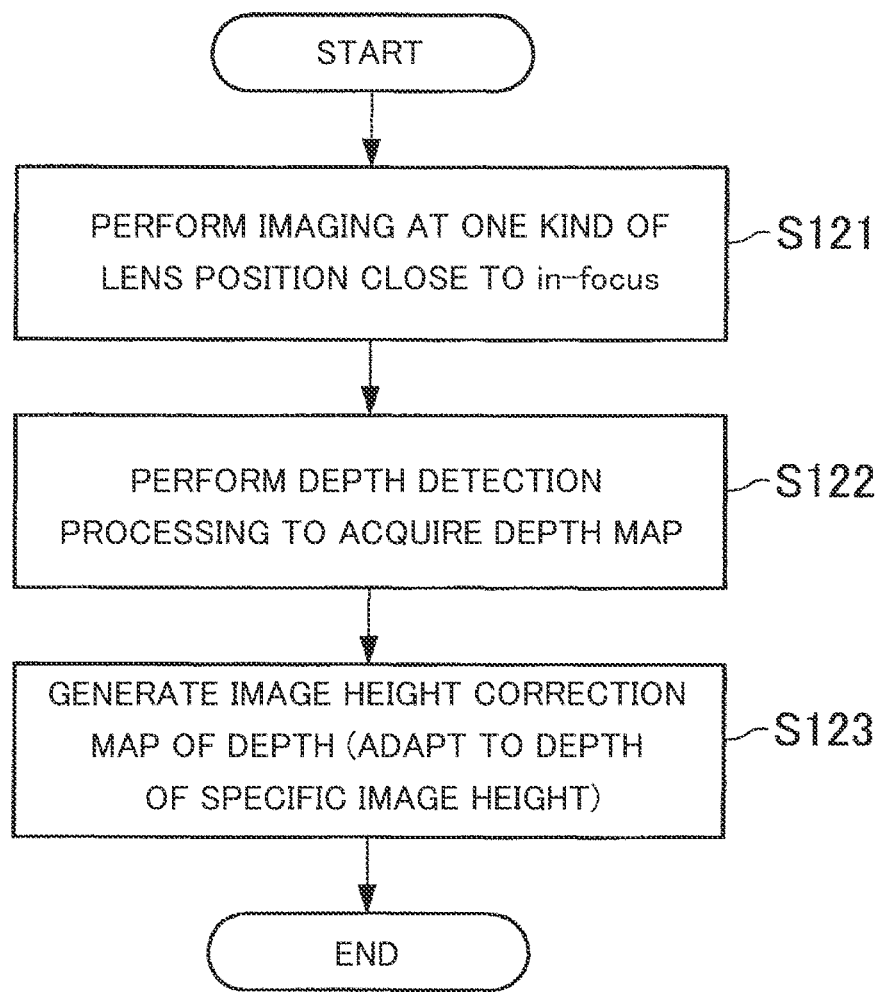
FIG. 13 is a flowchart illustrating an example of an operation of the imaging device according to the embodiment.

FIG. 13 is a flowchart illustrating an example of an operation of the imaging device 100 according to the embodiment and a flowchart illustrating a generation example of the correction map by the correction map generation unit 130.

The imaging device 100 moves the lens of the lens unit 110 to a position close to in-focus using the phase difference AF and performs imaging at the one kind of lens position (step S121). Subsequently, the depth detection processing unit 122 of the imaging device 100 performs the depth detection processing using an image captured at the lens position to acquire the depth map (step S122).

Then, the correction map generation unit 130 of the imaging device 100 generates the image height correction map of the depth adapted to a depth of a specific image height (for example, an image height of the image middle) using the one depth map (step S123).

(3) Correction Using Simulation Result

The imaging device 100 may calculate a depth value (an ideal depth value) in an ideal state in which there is no error, for example, by a simulation using design data of a lens included in the lens unit 110 and may generate a correction map in which actual depth data obtained by imaging a plate with texture is adapted to the ideal depth value. A method of generating the image height correction map using the actual data may be any method described above.

Figure 14:
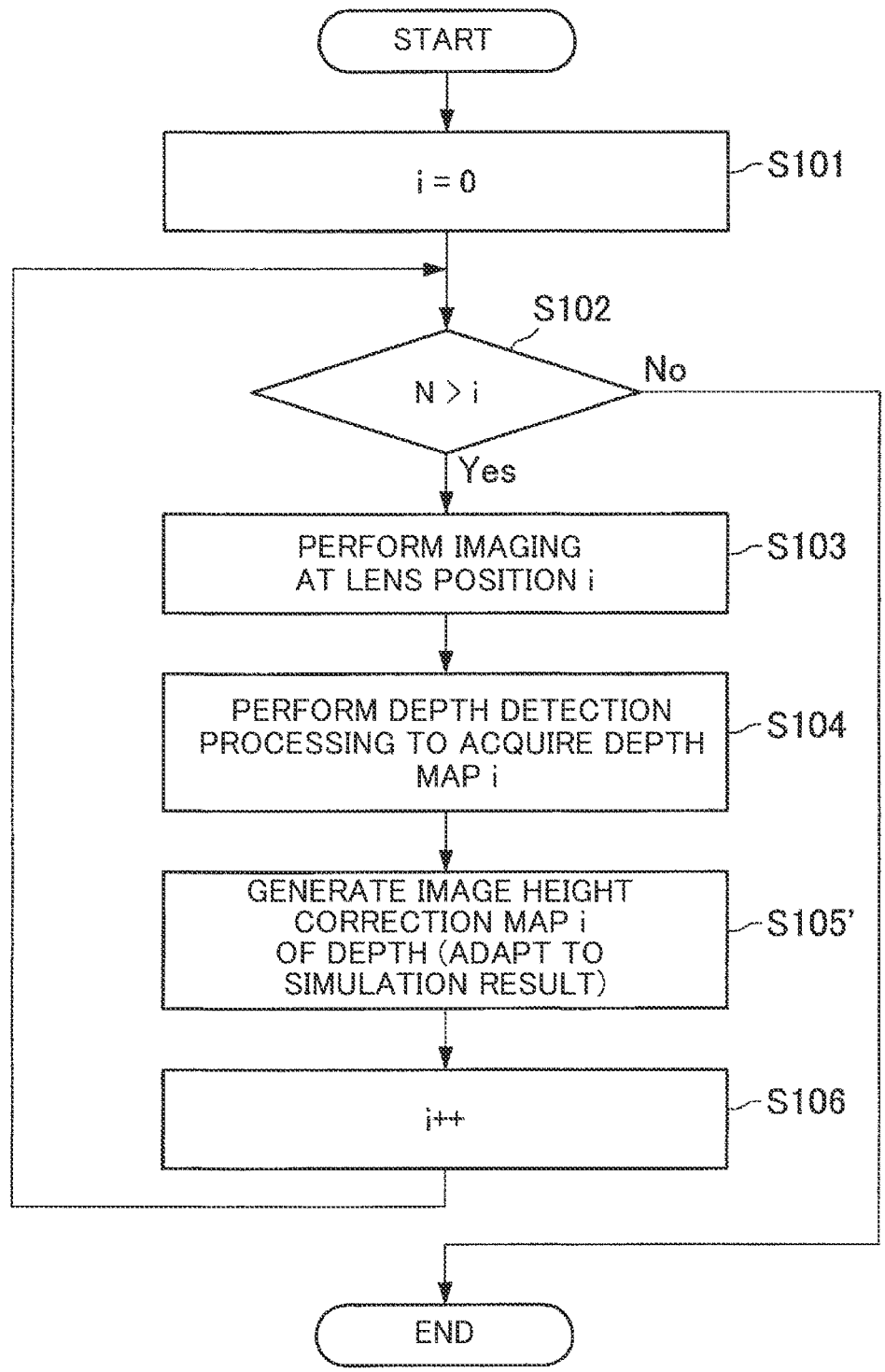
FIG. 14 is a flowchart illustrating an example of an operation of the imaging device according to the embodiment.

FIG. 14 is a modification example of the generation example of the correction map corresponding to the plurality of focuses illustrated in FIG. 11. The flowchart illustrated in FIG. 14 is different from the flowchart illustrated in FIG. 11 in that the image height correction map of the depth is generated to be adapted to a simulation result in processing of generating the image height map of the depth (step S105').

Figure 15:
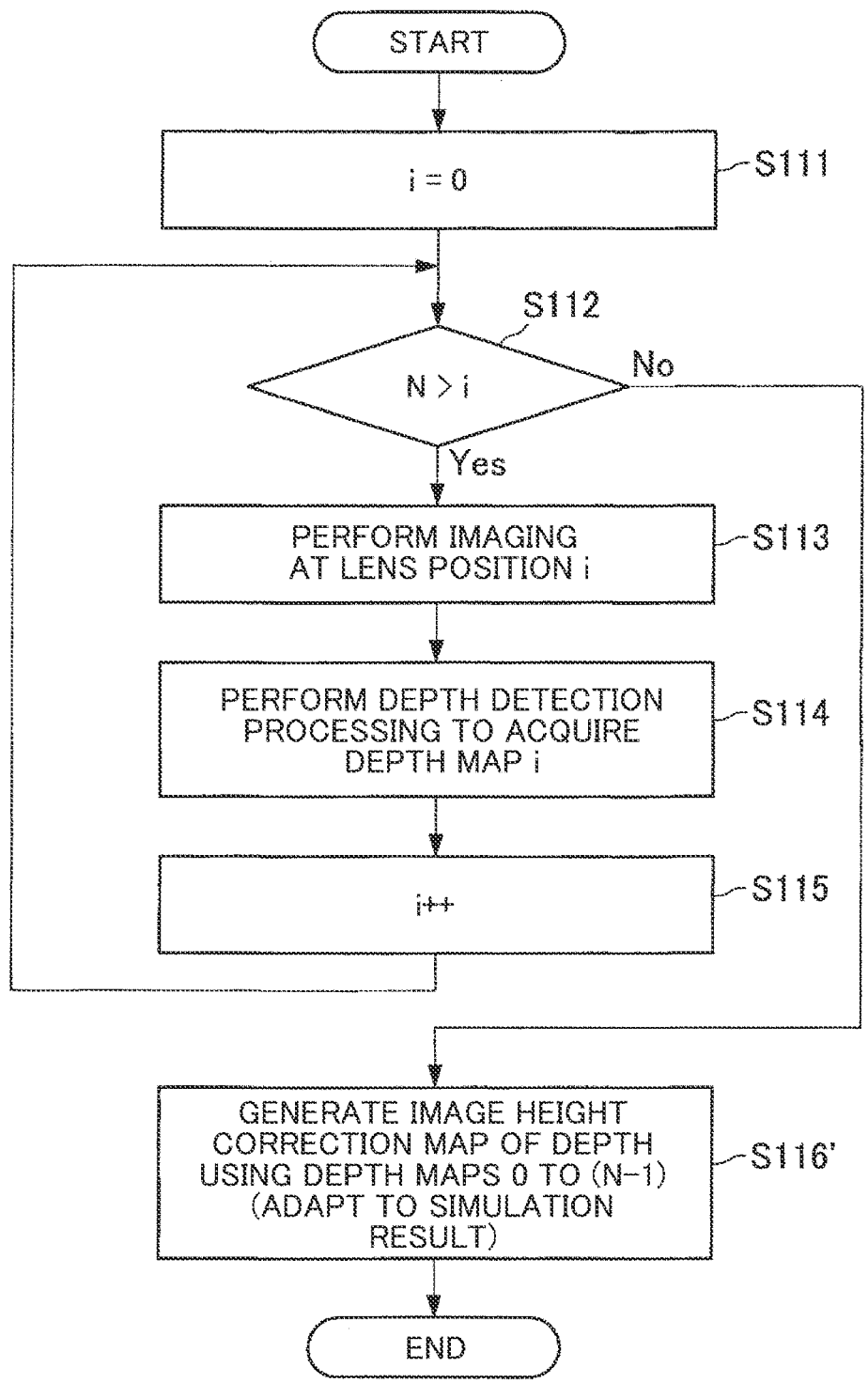
FIG. 15 is a flowchart illustrating an example of an operation of the imaging device according to the embodiment.

FIG. 15 is a modification example of the generation example of the correction map for performing calculation to reduce an image height variation of a polynomial of degree n illustrated in FIG. 12. The flowchart illustrated in FIG. 15 is different from the flowchart illustrated in FIG. 12 in that the image height correction map of the depth is generated to be adapted to a simulation result in processing of generating the image height map of the depth (step S116').

Figure 16:
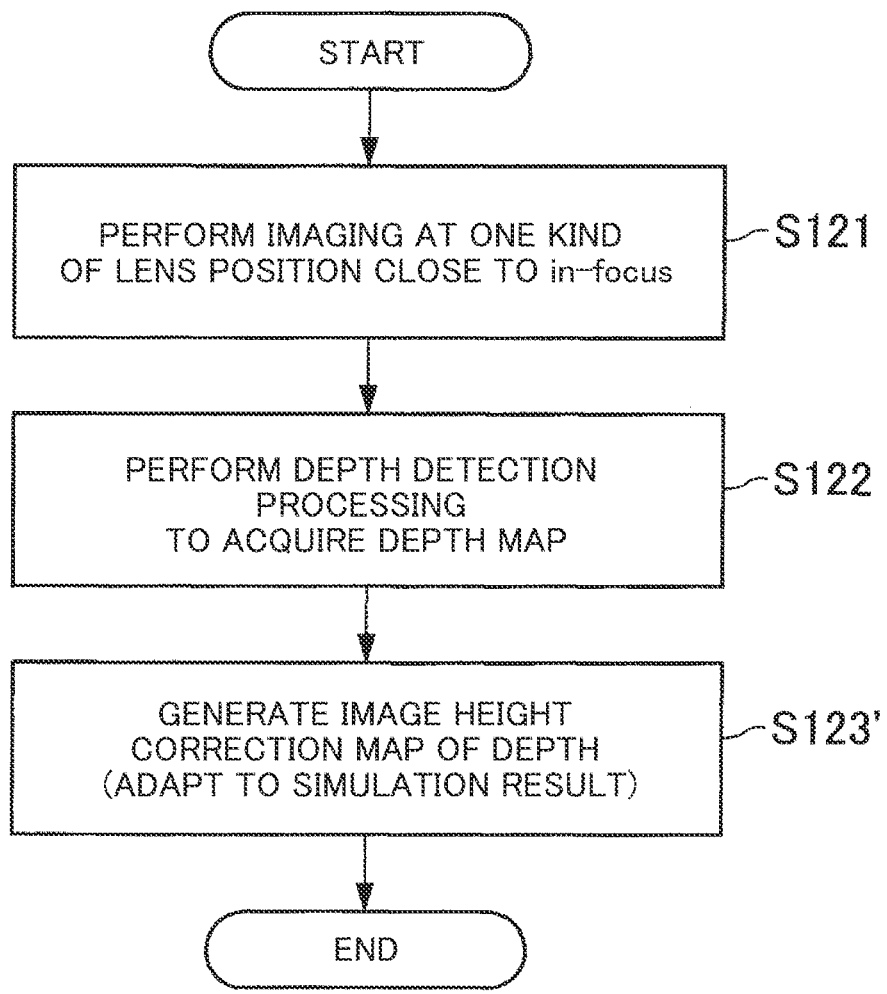
FIG. 16 is a flowchart illustrating an example of an operation of the imaging device according to the embodiment.

FIG. 16 is a modification example of the generation example of the correction map corresponding to one focus illustrated in FIG. 13. The flowchart illustrated in FIG. 16 is different from the flowchart illustrated in FIG. 13 in that the image height correction map of the depth is generated to be adapted to a simulation result in processing of generating the image height map of the depth (step S123').

(4) Imaging and Correction of Subject with Texture at a Plurality of Distances

Figure 17:
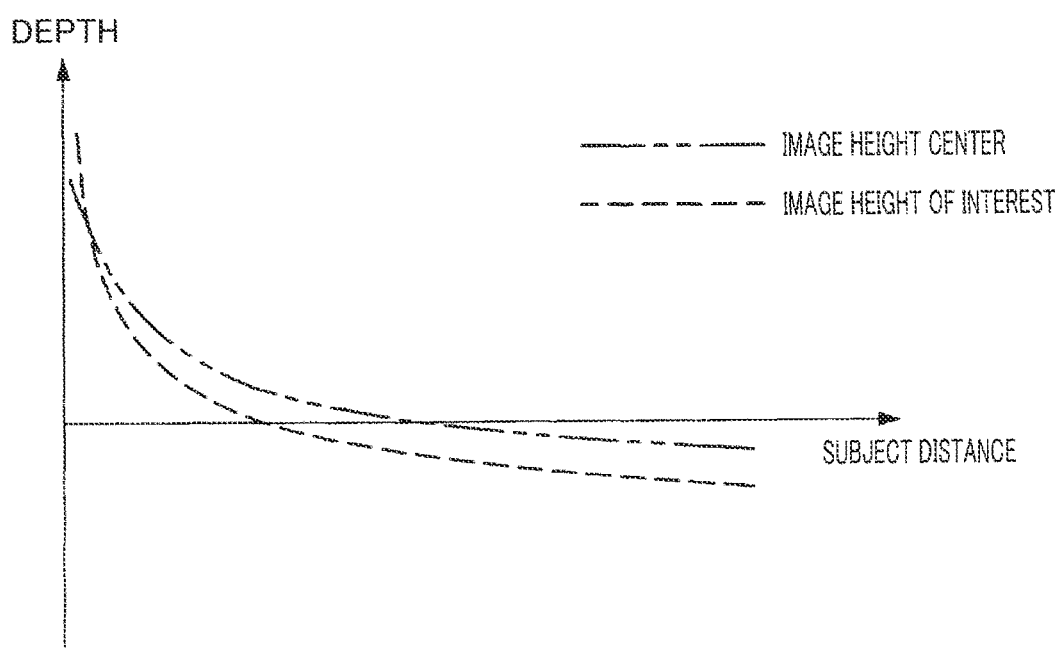
FIG. 17 is an explanatory diagram illustrating a relation between a depth and a distance from a subject in a graph.

FIG. 17 is an explanatory diagram illustrating a relation between a depth and a distance from a subject in a graph. FIG. 17 illustrates a relation between a depth and a distance from a subject at an image height center and a relation between a depth and a distance from the subject at a certain image height of interest.

For example, a plate with texture may be installed in front of a camera and the imaging device 100 may generate the correction map through imaging while changing a distance between the camera and the plate with the focus fixed. By generating the correction map in this way, it is possible to obtain a plurality of pieces of data indicating the relation illustrated in FIG. 17 at all the image height positions. The imaging device 100 can generate a map correcting a depth different at each image height by using the data.

Figure 18:
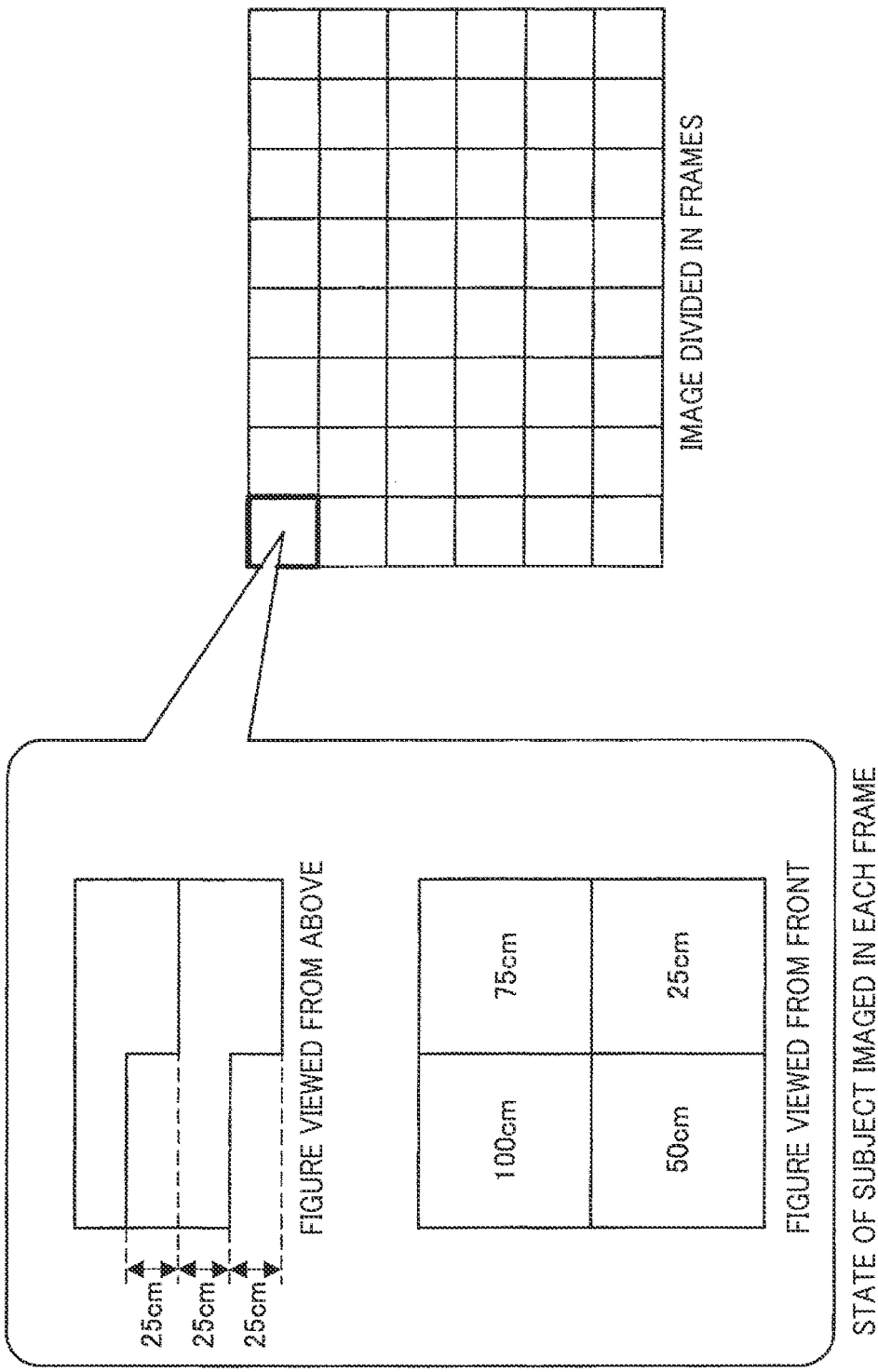
FIG. 18 is an explanatory diagram illustrating an example of a subject imaged by the imaging device at the time of generation a correction map.

FIG. 18 is an explanatory diagram illustrating an example of a subject imaged by the imaging device 100 at the time of generation a correction map. FIG. 18 illustrates an example of a subject including planes at a plurality of distances. The imaging device 100 may image a subject including planes at a plurality of distances within each region obtained by dividing an image illustrated in FIG. 18 and generate a correction map from the imaged data. Texture is assumed to be drawn on the planes illustrated in FIG. 18. The imaging device 100 can obtain data at the plurality of distances by imaging the subject illustrated in FIG. 18 once.

Figure 19:
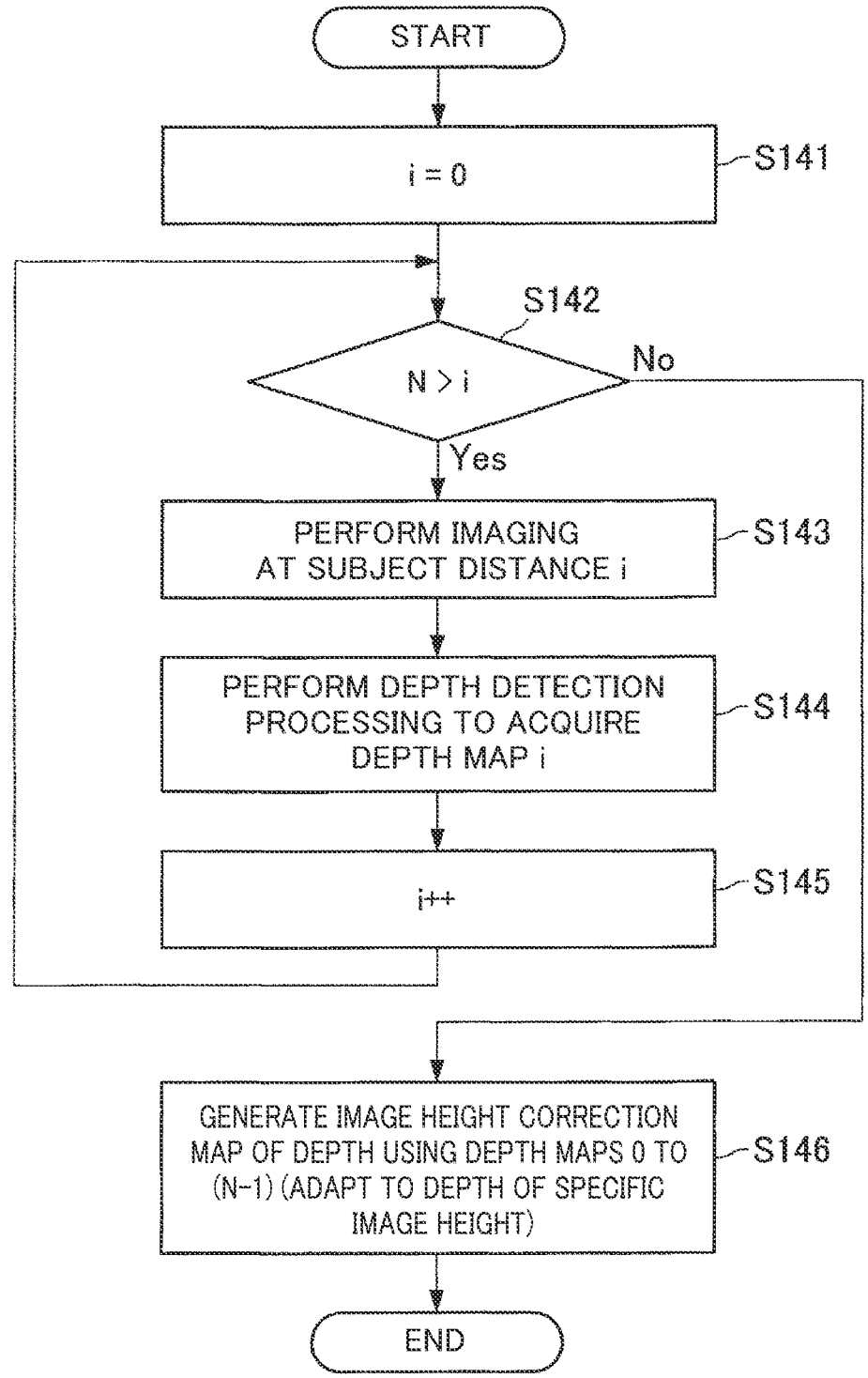
FIG. 19 is a flowchart illustrating an example of an operation of the imaging device according to the embodiment.

FIG. 19 is a flowchart illustrating an example of an operation of the imaging device 100 according to the embodiment and a flowchart illustrating a generation example of the correction map by the correction map generation unit 130.

The imaging device 100 first initializes the variable i to 0 (step S141). Subsequently, the imaging device 100 determines whether the variable i is less than a variable N indicating a desired number of depth maps (step S142). When i is less than N (Yes in step S142), the imaging device 100 images the plate with the texture at a subject position i, as described above (step S143). The subject position i is an i-th position among a plurality of pre-decided positions from the subject at the time of generation of the correction map.

Subsequently, the depth detection processing unit 122 of the imaging device 100 performs the depth detection processing using the image captured at the subject position i to acquire the depth map i (step S144). Subsequently, the imaging device 100 increments the variable i by one (step S145) and the process returns to the determination processing of step S142. When i is equal to or greater than N (No in step S142), the correction map generation unit 130 of the imaging device 100 generates an image height correction map of the depth adapted to a depth of a specific image height (for example, an image height of the image middle) using N depth maps (step S146).

Figure 20:
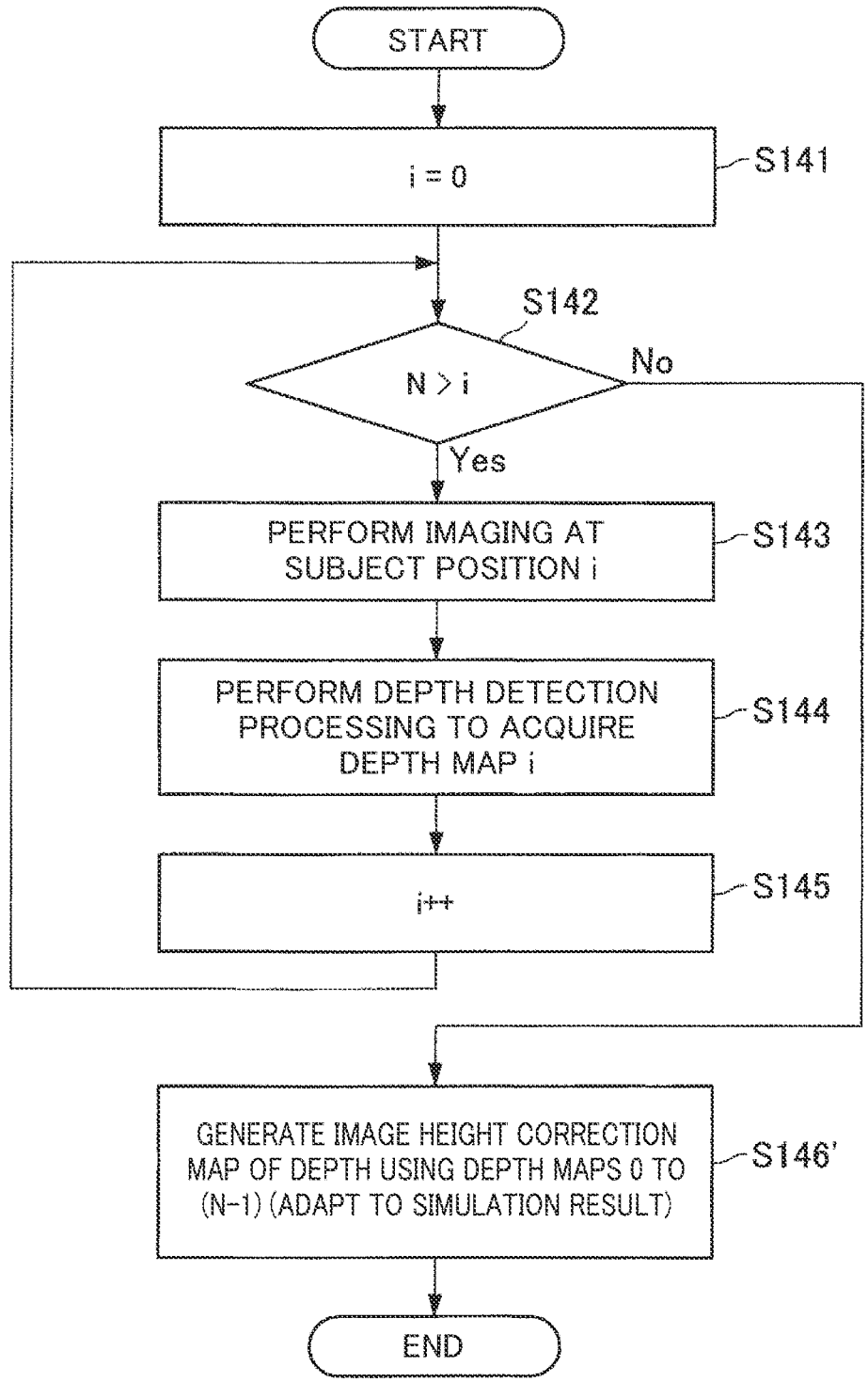
FIG. 20 is a flowchart illustrating an example of an operation of the imaging device according to the embodiment.

The processing of step S146 may be processing of generating the image height correction map adapted to a simulation result as in the flowchart illustrated in FIG. 20 (step S146').

(1.3.2) Change in Parameter of Application by Image Height

When the depth map is used in the application 124, the imaging device 100 according to the embodiment of the present disclosure may change parameters of an application for each image height without applying the processing of correcting the image height dependency to the depth map to reduce the image height dependency of the depth.

Figure 21:
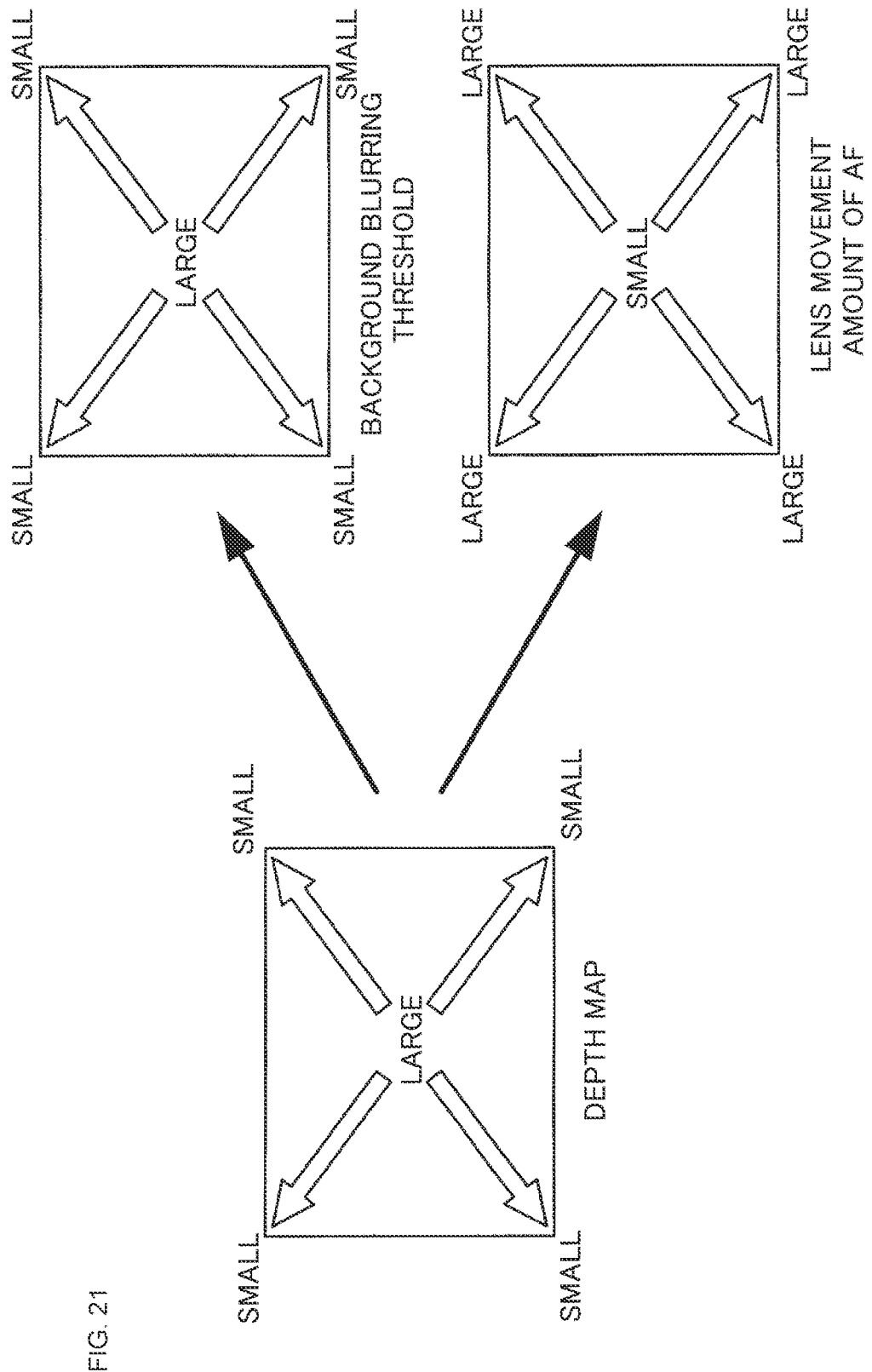
FIG. 21 is an explanatory diagram illustrating a relation example between a difference of a depth at an image height and a parameter of an application changed due to the difference.

FIG. 21 is an explanatory diagram illustrating a relation example between a difference of a depth at an image height and a parameter of the application changed due to the difference. As in FIG. 21, a case in which magnitude of a depth differs at an image height center and an image height end when the plate with texture is imaged will be considered. In this case, when the background of the depth map is blurred and used in the application 124, the imaging device 100 changes a threshold for determining a blurring image with a change in the depth in accordance with the image height. When the depth map is used for autofocus processing in the application 124, the imaging device 100 changes a constant of proportion of a movement amount of the depth and the lens with the change in the depth in accordance with the image height.

When the image height dependency is reduced by changing the parameter in the application 124, the correction map may be generated by the method of one of FIGS. 11 to 16 described above.

Figure 22:
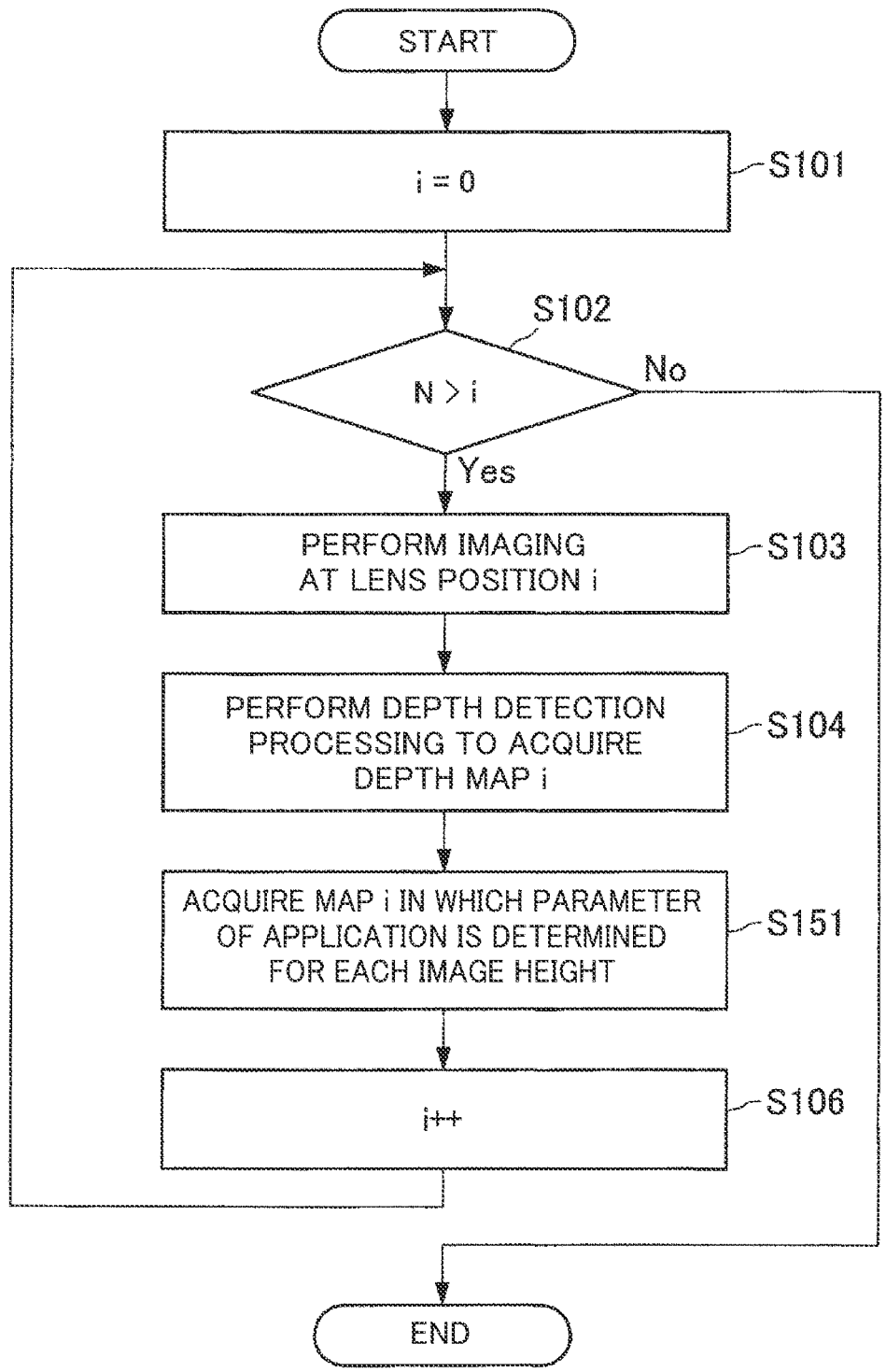
FIG. 22 is a flowchart illustrating an example of an operation of the imaging device according to the embodiment.

FIG. 22 is a flowchart illustrating an example of an operation of the imaging device 100 according to the embodiment and a flowchart illustrating a generation example of the correction map corresponding to a plurality of focuses by the correction map generation unit 130.

In the flowchart illustrated in FIG. 22, a correction map corresponding to a plurality of lens position is generated from the depth map obtained through imaging at the lens positions, as in the flowchart illustrated in FIG. 11. The processing illustrated in FIG. 22 is different from the processing illustrated in FIG. 11 in that the correction map in which the parameter of the application is determined for each image height is acquired rather than the image height correction map of the depth (step S151).

Figure 23:
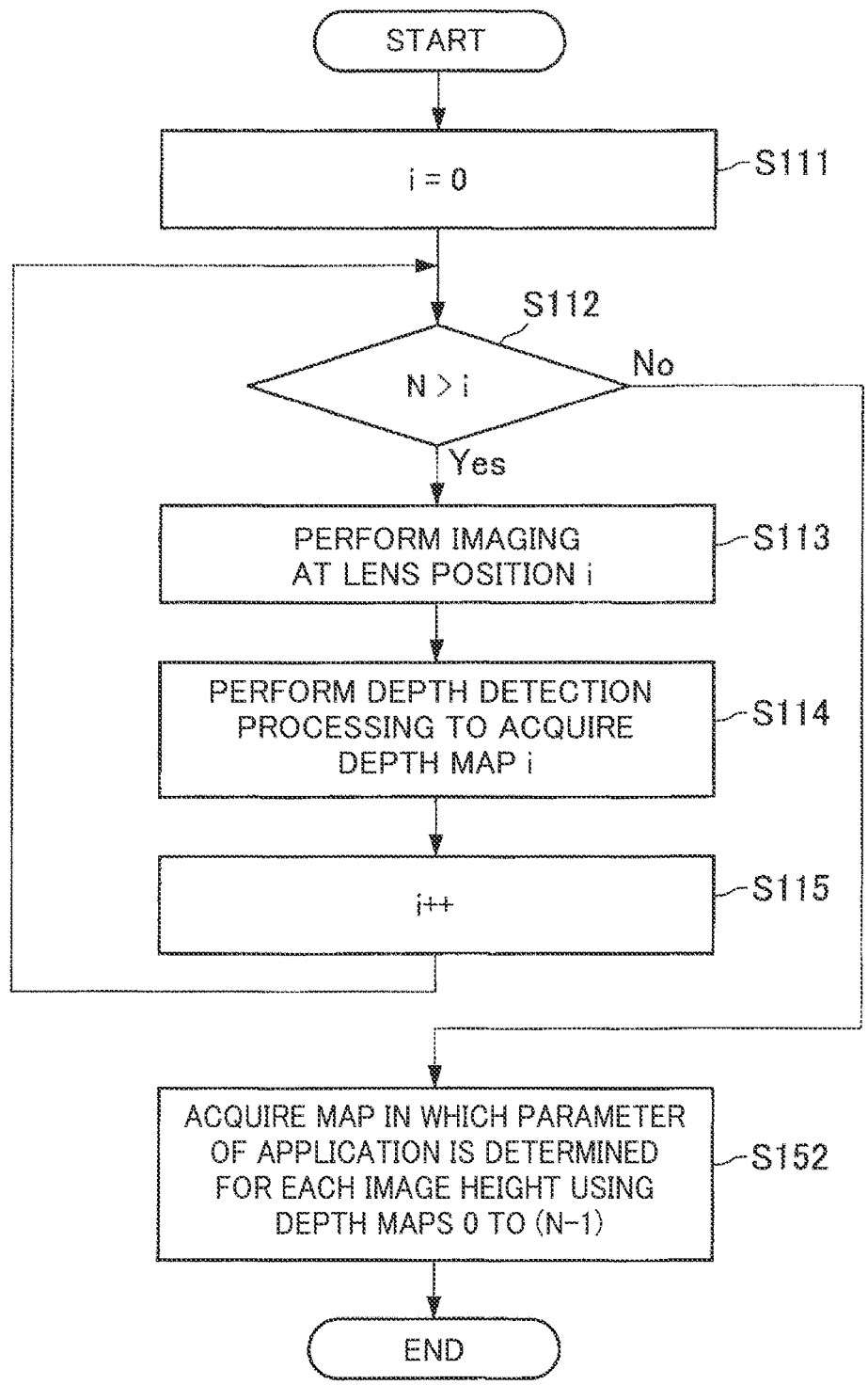
FIG. 23 is a flowchart illustrating an example of an operation of the imaging device according to the embodiment.

FIG. 23 is a flowchart illustrating an example of an operation of the imaging device 100 according to the embodiment and a flowchart illustrating a generation example of the correction map by the correction map generation unit 130.

In the flowchart illustrated in FIG. 23, the correction map is generated for performing calculation to reduce a variation in the image height of a polynomial of degree n as in the flowchart illustrated in FIG. 12. The processing illustrated in FIG. 23 is different from the processing illustrated in FIG. 12 in that the correction map in which the parameter of the application is acquired for each image height is acquired rather than the image height correction map of the depth (step S152).

Figure 24:
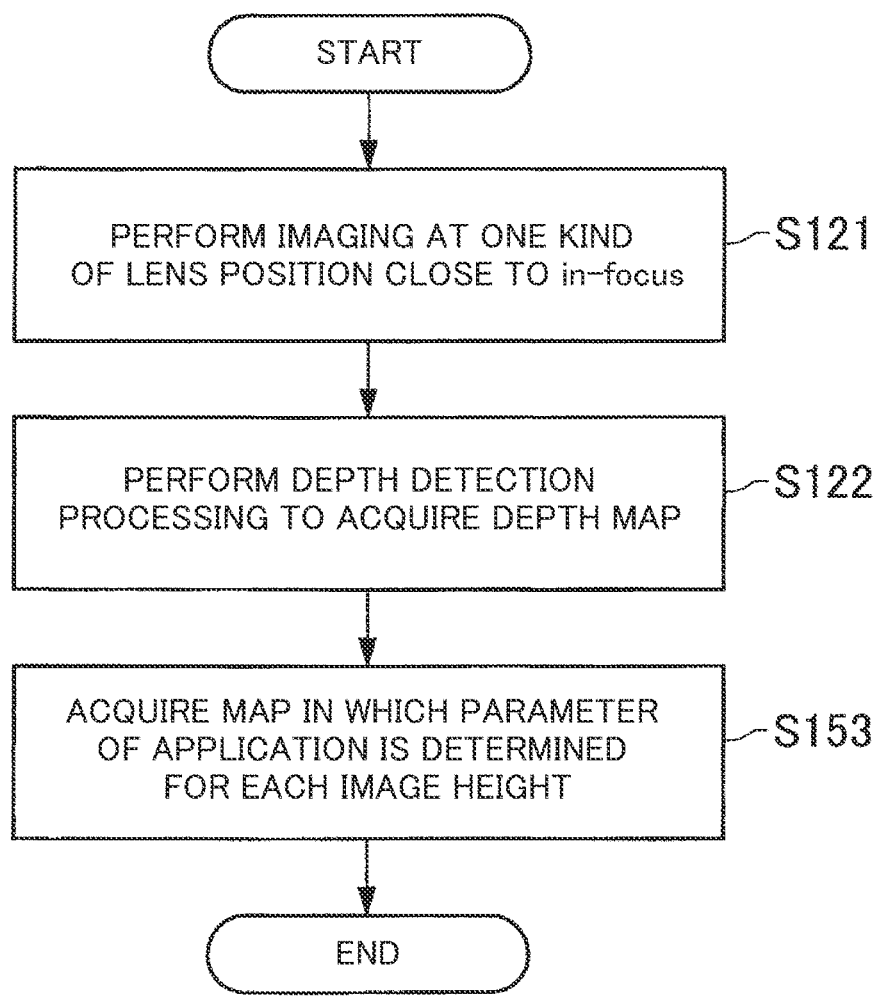
FIG. 24 is a flowchart illustrating an example of an operation of the imaging device according to the embodiment.

FIG. 24 is a flowchart illustrating an example of an operation of the imaging device 100 according to the embodiment and a flowchart illustrating a generation example of the correction map by the correction map generation unit 130.

In the flowchart illustrated in FIG. 24, the correction map is generated through imaging at one lens position (for example, in-focus position) as in the flowchart illustrated in FIG. 13. The processing illustrated in FIG. 24 is different from the processing illustrated in FIG. 13 in that the correction map in which the parameter of the application is acquired for each image height is acquired rather than the image height correction map of the depth (step S153).

In the examples of FIGS. 22 to 24, the correction map corresponding to a lens position is generated from the depth map obtained through imaging at one lens position or a plurality of lens positions, but the present disclosure is not limited to the examples. The imaging device 100 may generate the correction map adapted to a simulation result as in the processing illustrated in FIGS. 14 to 16.

(1.3.3) Correction of Pupil Division Image for Depth Detection

The imaging device 100 according to the embodiment uses a plurality of pupil division images to detect a depth. At this time, the imaging device 100 may reduce the image height dependency of the depth by correcting the pupil division images.

Of the pupil division pixels, an image obtained by collecting only left pixels as in FIG. 2A is referred to as an L image and an image obtained by collecting only right pixels as in FIG. 2B is referred to as an R image. The imaging device 100 according to the embodiment is assumed to image a plate with texture and perform depth detection using the L and R images. Of course, as described above, the pupil division images used to detect a depth may be generated not only from the left and right pixels but also from the pupil division pixels set to be different in the upper and lower directions or the diagonal directions.

Figure 25:
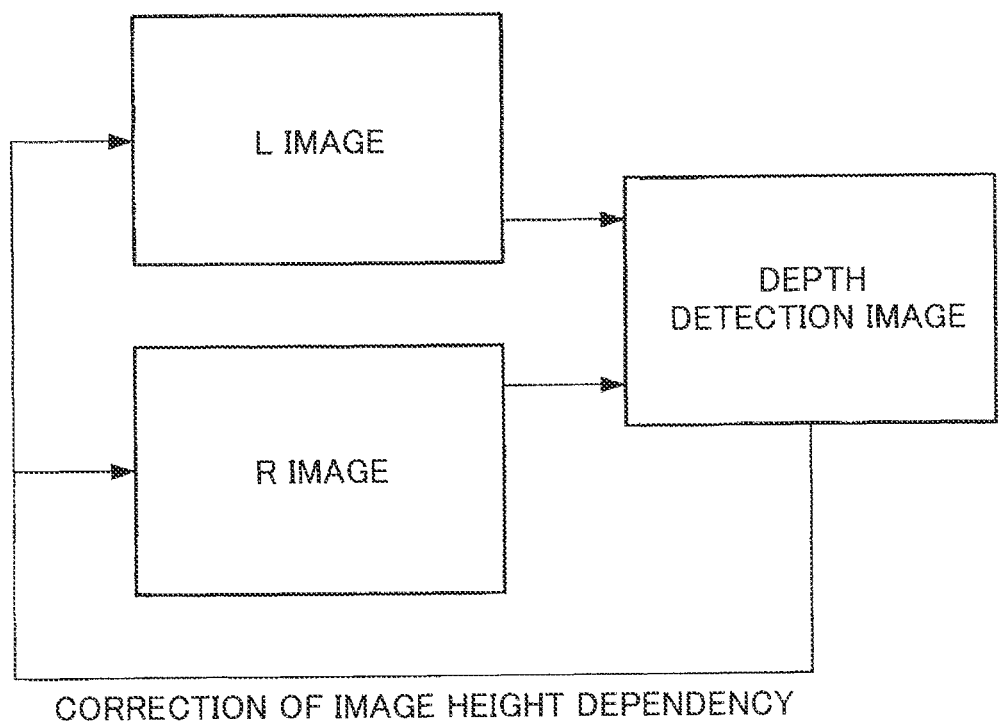
FIG. 25 is an explanatory diagram illustrating an aspect in which a pupil division image is corrected from a depth map obtained from the pupil division image.

The imaging device 100 may reduce a variation in the depth at all the image heights by correcting the L and R image with reference to the depth map obtained from the L and R images. FIG. 25 is an explanatory diagram illustrating an aspect in which the L and R images are corrected from depth map obtained from the L and R images. In the correction, the imaging device 100 generates a map in which a correction value for correction at each image height is recorded for each of the L and R images.

When the image height dependency is reduced by correcting the pupil division image, the correction map may be generated by the method of one of FIGS. 11 to 16 described above.

Figure 26:
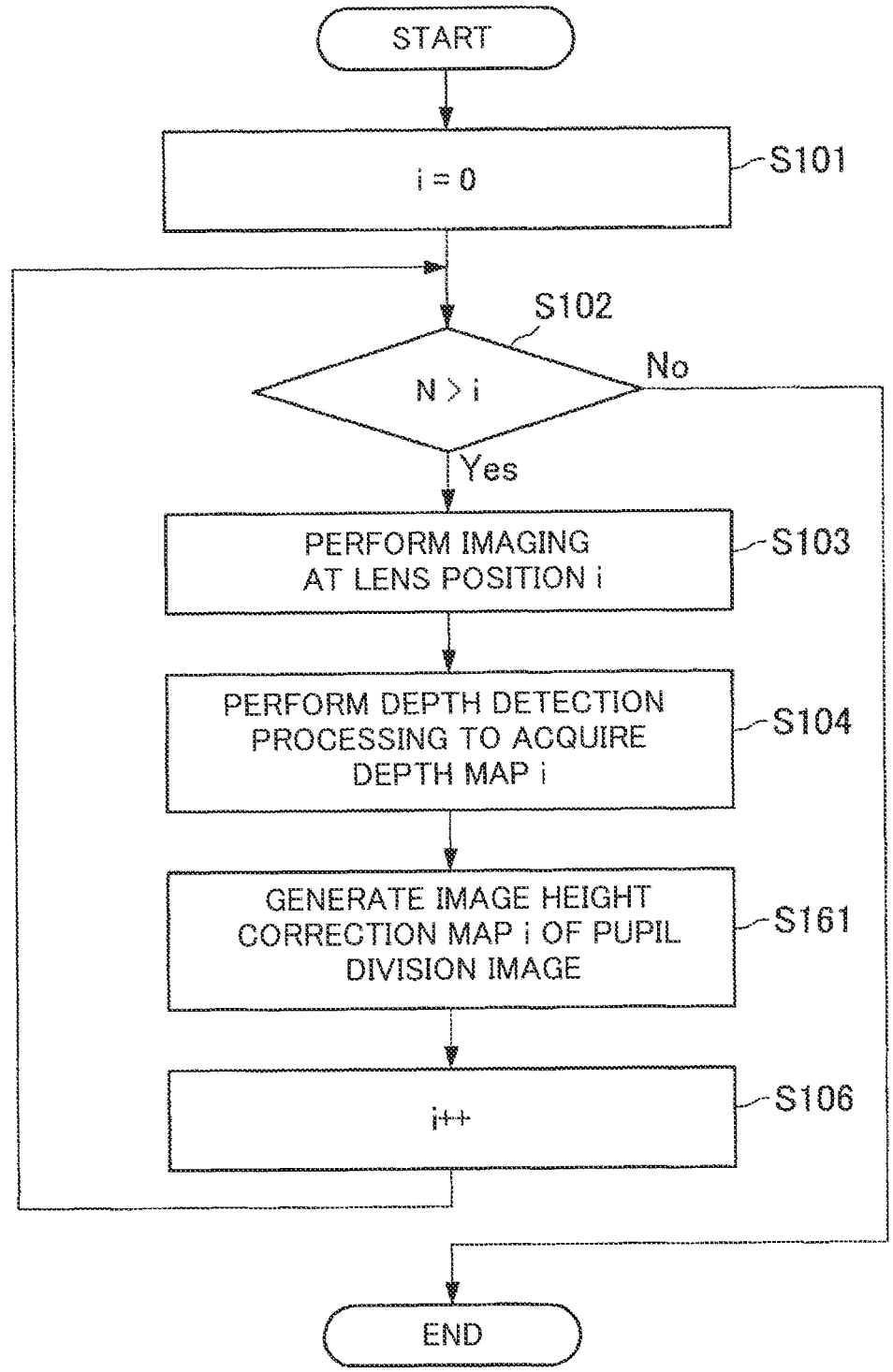
FIG. 26 is a flowchart illustrating an example of an operation of the imaging device according to the embodiment.

FIG. 26 is a flowchart illustrating an example of an operation of the imaging device 100 according to the embodiment and a flowchart illustrating a generation example of the correction map corresponding to a plurality of focuses by the correction map generation unit 130.

In the flowchart illustrated in FIG. 26, a correction map corresponding to a plurality of lens position is generated from the depth map obtained through imaging at the lens positions, as in the flowchart illustrated in FIG. 11. The processing illustrated in FIG. 26 is different from the processing illustrated in FIG. 11 in that the correction map for correcting the pupil division image is corrected is acquired (step S161).

Figure 27:
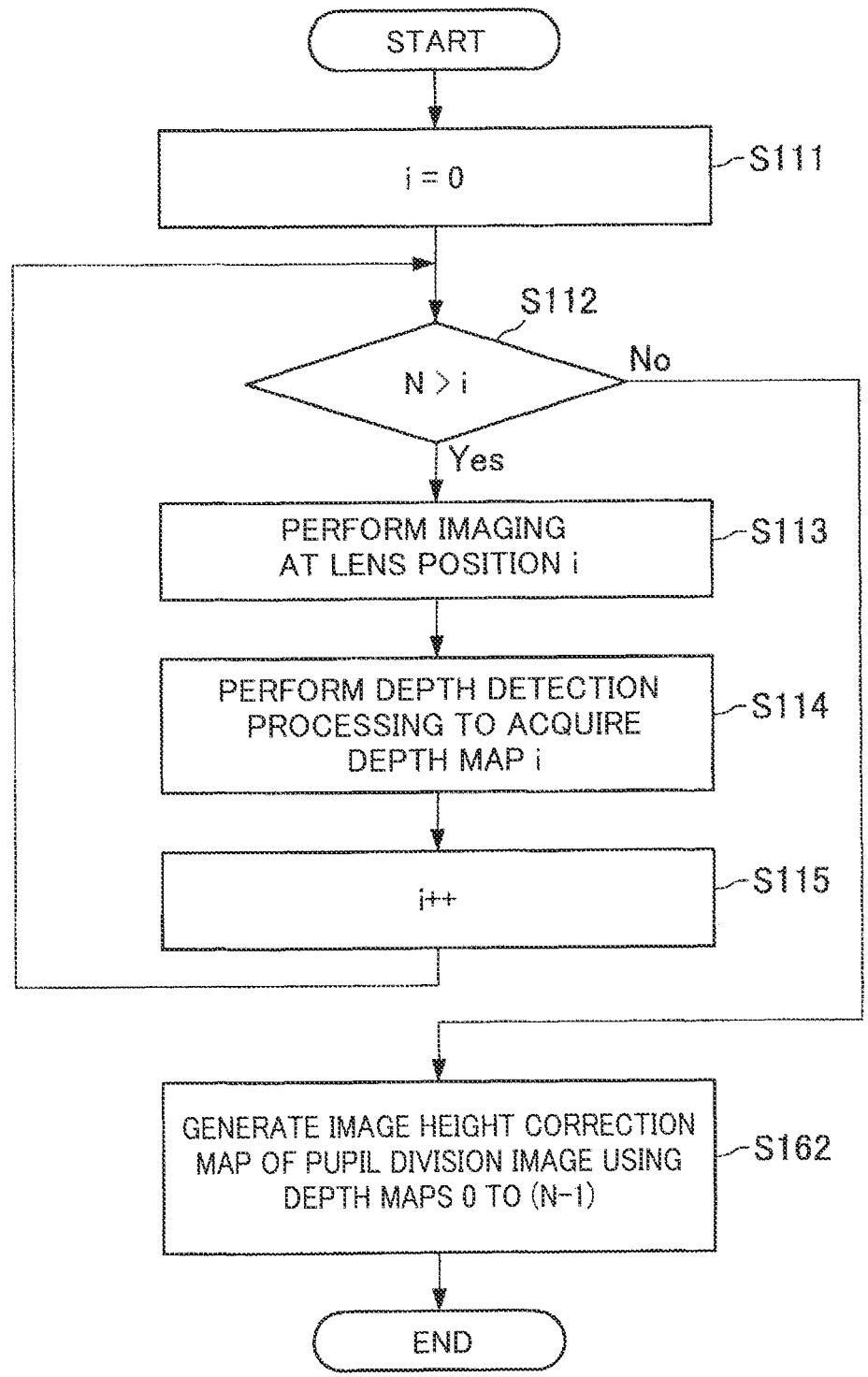
FIG. 27 is a flowchart illustrating an example of an operation of the imaging device according to the embodiment.

FIG. 27 is a flowchart illustrating an example of an operation of the imaging device 100 according to the embodiment and a flowchart illustrating a generation example of the correction map by the correction map generation unit 130.

In the flowchart illustrated in FIG. 27, a correction map is acquired for performing calculation to reduce a variation in the image height of a polynomial of degree n as in the flowchart illustrated in FIG. 12. The processing illustrated in FIG. 27 is different from the processing illustrated in FIG. 11 in that the correction map for correcting the pupil division image is corrected (step S162).

Figure 28:
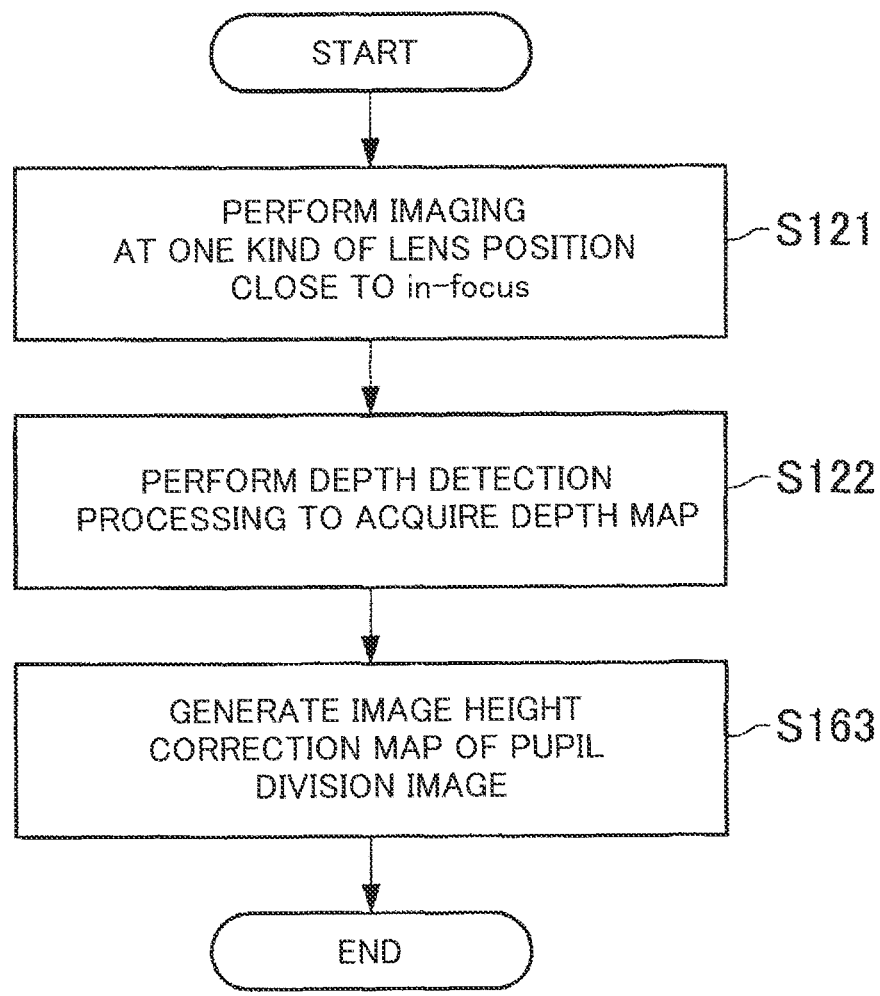
FIG. 28 is a flowchart illustrating an example of an operation of the imaging device according to the embodiment.

FIG. 28 is a flowchart illustrating an example of an operation of the imaging device 100 according to the embodiment and a flowchart illustrating a generation example of the correction map by the correction map generation unit 130.

In the flowchart illustrated in FIG. 28, the correction map is generated through imaging at one lens position (for example, in-focus position) as in the flowchart illustrated in FIG. 13. The processing illustrated in FIG. 28 is different from the processing illustrated in FIG. 13 in that the correction map for correcting the pupil division image is acquired (step S163).

In the examples of FIGS. 26 to 28, the correction map corresponding to a lens position is generated from the depth map obtained through imaging at one lens position or a plurality of lens positions, but the present disclosure is not limited to the examples.

The imaging device 100 may generate the correction map adapted to a simulation result as in the processing illustrated in FIGS. 14 to 16.

(1.3.4) Combination of Methods Described Above

The imaging device 100 according to the embodiment of the present disclosure may generate a correction map for correcting image height dependency in which the above-described schemes are combined by changing both a lens position and a distance from a subject.

That is, the imaging device 100 according to the embodiment of the present disclosure may generate a correction map through imaging by changing the lens position at each distance while changing a distance between the plate with texture and the image sensor. Conversely, the imaging device 100 according to the embodiment of the present disclosure may generate a correction map through imaging by changing a distance between the plate and the image sensor while changing the lens position.

Figure 29:
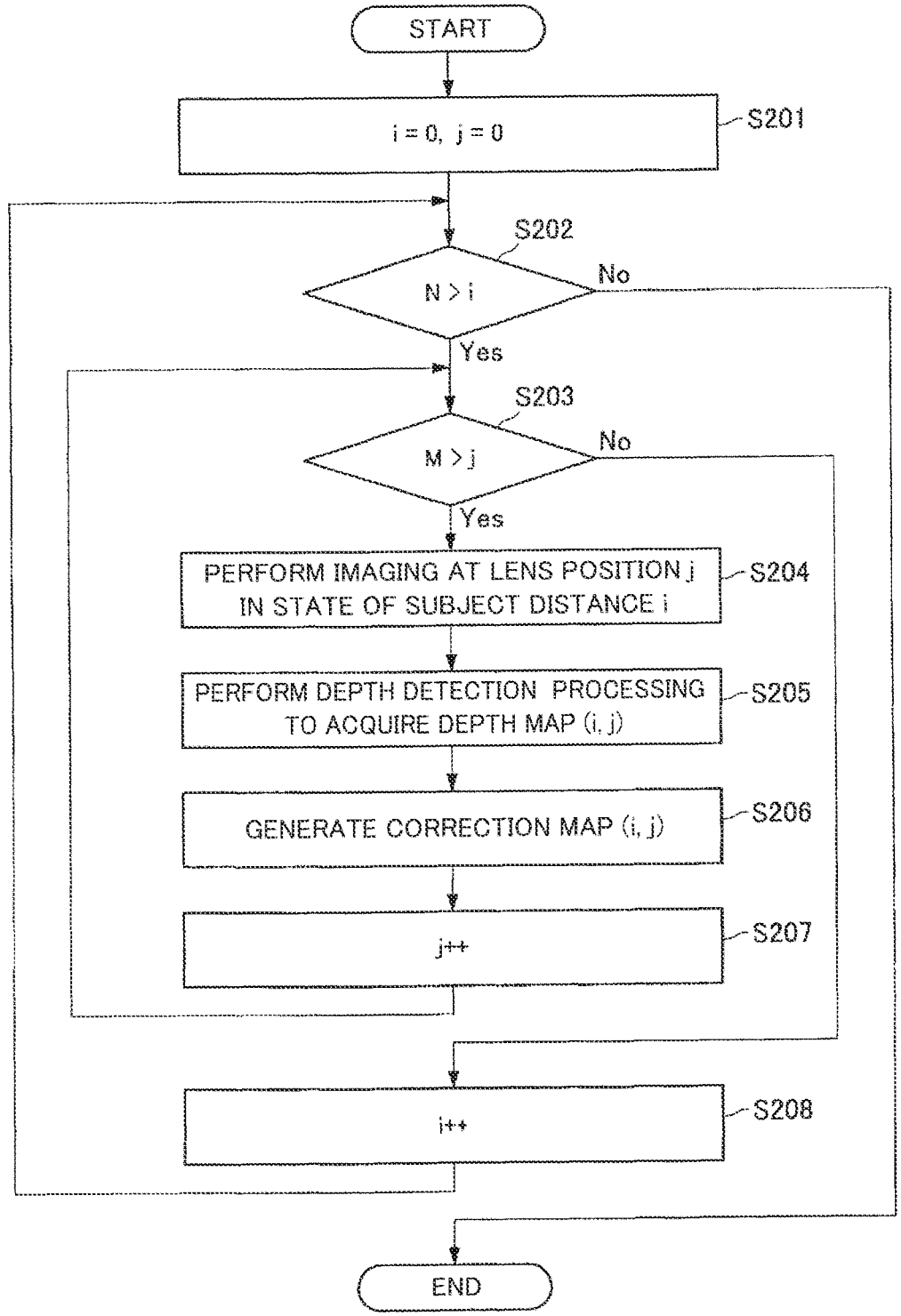
FIG. 29 is a flowchart illustrating an example of an operation of the imaging device according to the embodiment.

FIG. 29 is a flowchart illustrating an example of an operation of the imaging device 100 according to the embodiment and a flowchart illustrating a generation example of the correction map by the correction map generation unit 130.

The imaging device 100 first initializes both variables i and j to 0 (step S201). Subsequently, the imaging device 100 determines whether the variable i is less than a variable N (step S202). When i is less than N (Yes in step S202), the imaging device 100 determines whether the variable j is less than a variable M (step S203). When j is less than M (Yes in step S203), the imaging device 100 performs imaging at a lens position j in a state of the distance i from a subject (a plate with texture) (step S204).

Subsequently, the depth detection processing unit 122 of the imaging device 100 performs the depth detection processing using an image captured at the lens position j and at the distance i from the subject to acquire a depth map (i, j) (step S205). Then, the correction map generation unit 130 of the imaging device 100 generates an image height correction map (i, j) of the depth adapted to a depth of a specific image height (for example, an image height of the image middle) using a depth map (i, j) (step S206).

Thereafter, the imaging device 100 increments the variable i by one (step S207) and the process returns to the determination processing of step S203. When j is equal to or greater than M (No in step S203), the imaging device 100 increments the variable i by one (step S208) and the process returns to the determination processing of step S202. When i is equal to or greater than N (No in step S202), the imaging device 100 ends the series of processing.

In the processing illustrated in FIG. 29, the distance from the subject is fixed and then the lens position is moved, and the distance from the subject is changed when the imaging ends at all the lens positions, but the present disclosure is not limited to the example. The lens position may be first fixed, and then the distance from the subject may be changed, and the lens position may be changed when the imaging ends at all the distances from the subject.

Figure 30:
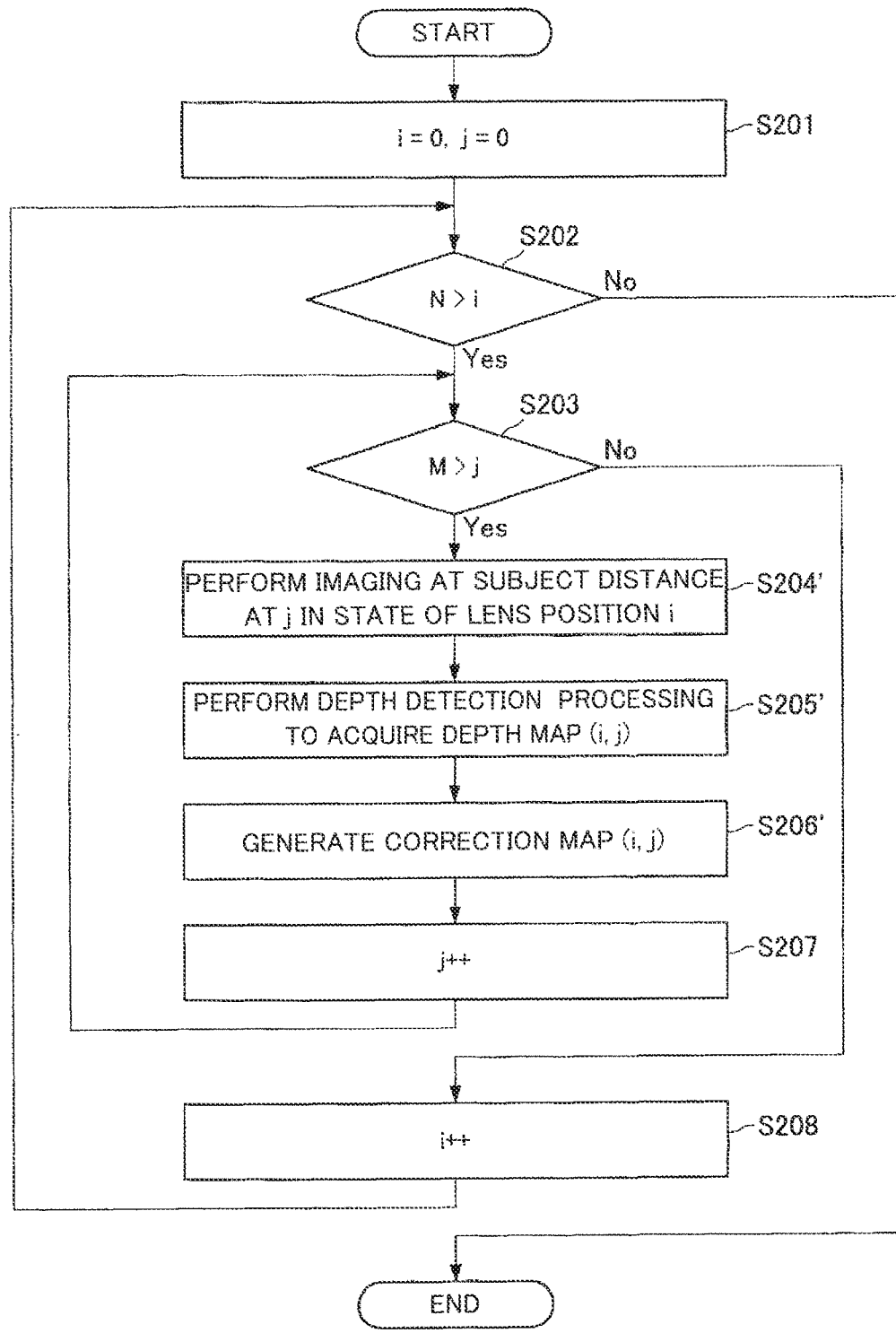
FIG. 30 is a flowchart illustrating an example of an operation of the imaging device according to the embodiment.

FIG. 30 is a flowchart illustrating an example of an operation of the imaging device 100 according to the embodiment and a flowchart illustrating a generation example of the correction map by the correction map generation unit 130.

The imaging device 100 first initializes both the variables i and j to 0 (step S201). Subsequently, the imaging device 100 determines whether the variable i is less than a variable N (step S202). When i is less than N (Yes in step S202), the imaging device 100 continuously determines whether the variable j is less than a variable M (step S203). When j is less than M (Yes in step S203), the imaging device 100 performs imaging at the distance j from a subject (a plate with texture) in a state of the lens position i (step S204').

Subsequently, the depth detection processing unit 122 of the imaging device 100 performs the depth detection processing using an image captured at the lens position i and at the distance j from the subject to acquire the depth map (i, j) (step S205'). Then, the correction map generation unit 130 of the imaging device 100 generates the image height correction map (i, j) of the depth adapted to a depth of a specific image height (for example, an image height of the image middle) using the depth map (i, j) (step S206').

Thereafter, the imaging device 100 increments the variable i by one (step S207) and the process returns to the determination processing of step S203. When j is equal to or greater than M (No in step S203), the imaging device 100 increments the variable i by one (step S208) and the process returns to the determination processing of step S202. When i is equal to or greater than N (No in step S202), the imaging device 100 ends the series of processing.

Figure 31:
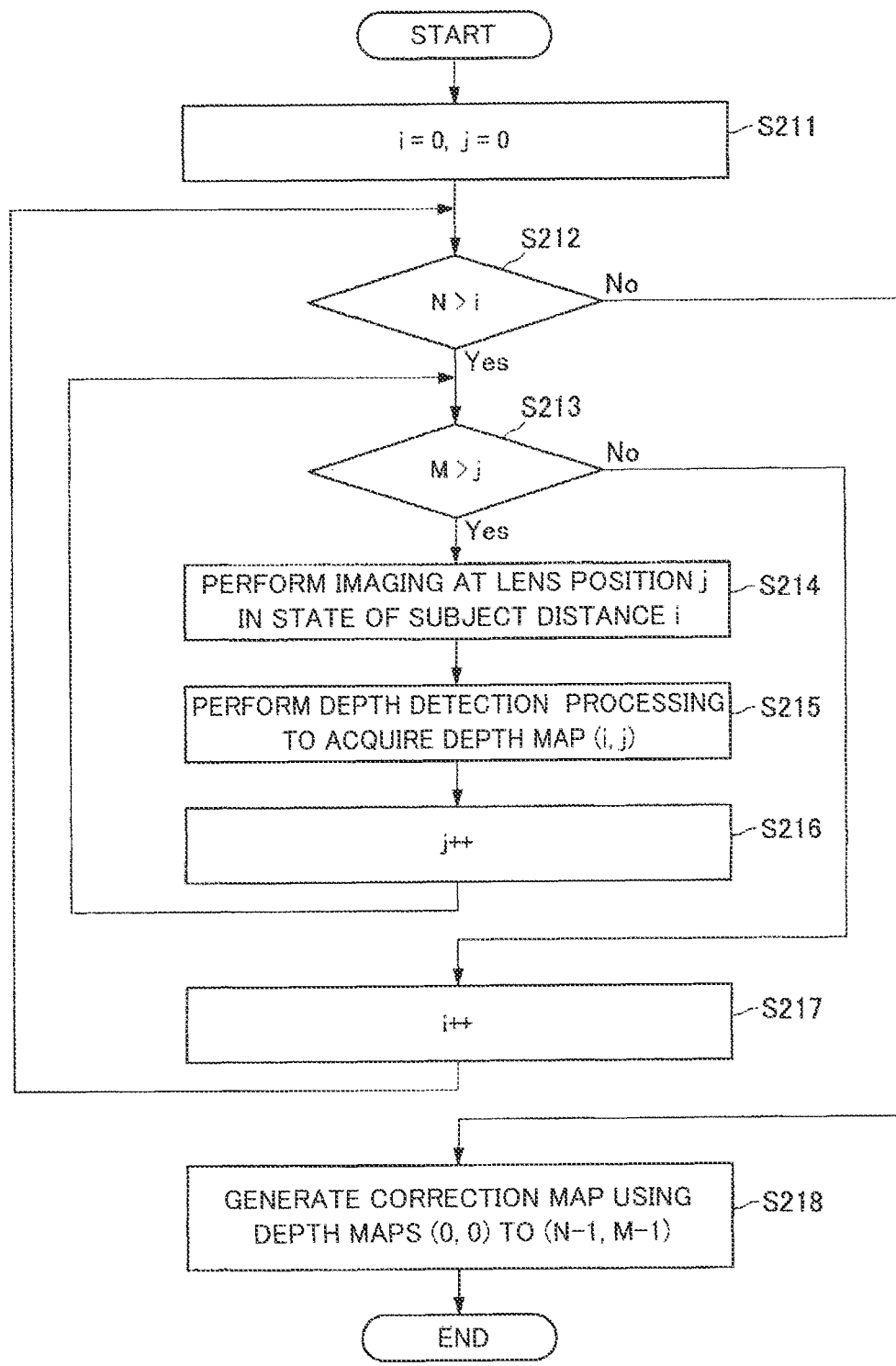
FIG. 31 is a flowchart illustrating an example of an operation of the imaging device according to the embodiment.

FIG. 31 is a flowchart illustrating an example of an operation of the imaging device 100 according to the embodiment and a flowchart illustrating a generation example of the correction map by the correction map generation unit 130.

The imaging device 100 first initializes both the variables i and j to 0 (step S211). Subsequently, the imaging device 100 determines whether the variable i is less than a variable N (step S212). When i is less than N (Yes in step S212), the imaging device 100 continuously determines whether the variable j is less than a variable M (step S213). When j is less than M (Yes in step S213), the imaging device 100 performs imaging at the lens position j in a state of the distance i from a subject (a plate with texture) (step S214).

Subsequently, the depth detection processing unit 122 of the imaging device 100 performs the depth detection processing using an image captured at the lens position j and at the distance i from the subject to acquire the depth map (i, j) (step S215).

Thereafter, the imaging device 100 increments the variable i by one (step S216) and the process returns to the determination processing of step S213. When j is equal to or greater than M (No in step S213), the imaging device 100 increments the variable i by one (step S217) and the process returns to the determination processing of step S212. When i is equal to or greater than N (No in step S212), the correction map generation unit 130 of the imaging device 100 generates the image height correction map of the depth adapted to a depth of a specific image height (for example, an image height of the image middle) using the depth map (0, 0) to the depth map (N−1, M−1) (step S218). When the correction map is generated, the imaging device 100 ends the series of processing.

In the processing illustrated in FIG. 31, the distance from the subject is fixed and then the lens position is moved, and the distance from the subject is changed when the imaging ends at all the lens positions, but the present disclosure is not limited to the example. The lens position may be first fixed, and then the distance from the subject may be changed, and the lens position may be changed when the imaging ends at all the distances from the subject.

Figure 32:
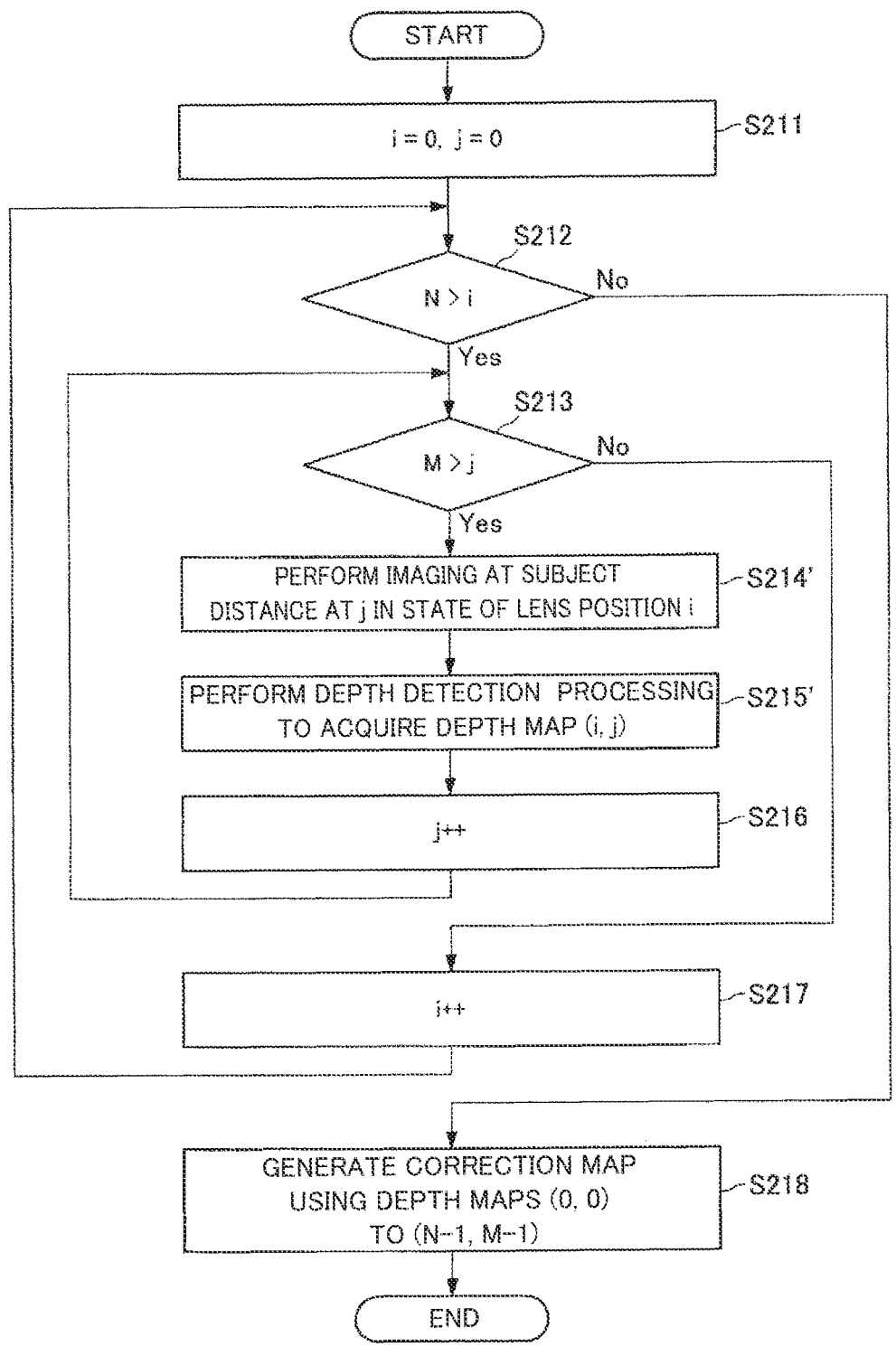
FIG. 32 is a flowchart illustrating an example of an operation of the imaging device according to the embodiment.

FIG. 32 is a flowchart illustrating an example of an operation of the imaging device 100 according to the embodiment and a flowchart illustrating a generation example of the correction map by the correction map generation unit 130.

The imaging device 100 first initializes both the variables i and j to 0 (step S211). Subsequently, the imaging device 100 determines whether the variable i is less than a variable N (step S212). When i is less than N (Yes in step S212), the imaging device 100 determines whether the variable j is less than a variable M (step S213). When j is less than M (Yes in step S213), the imaging device 100 performs imaging at the distance j from a subject (a plate with texture) in a state of the lens position i (step S214').

Subsequently, the depth detection processing unit 122 of the imaging device 100 performs the depth detection processing using an image captured at the lens position i of the distance j from the subject to acquire the depth map (i, j) (step S215').

Thereafter, the imaging device 100 increments the variable i by one (step S216) and the process returns to the determination processing of step S213. When j is equal to or greater than M (No in step S213), the imaging device 100 increments the variable i by one (step S217) and the process returns to the determination processing of step S212. When i is equal to or greater than N (No in step S212), the correction map generation unit 130 of the imaging device 100 generates the image height correction map of the depth adapted to a depth of a specific image height (for example, an image height of the image middle) using the depth map (0, 0) to the depth map (N−1, M−1) (step S218). When the correction map is generated, the imaging device 100 ends the series of processing.

The correction maps generate in FIGS. 29 to 32 are not limited to the above-described maps (the map for correcting the depth map itself, the map for correcting the parameter of the application, and the map for correcting the pupil division image), and any map can be used as long as the image height dependency of the depth can be corrected.

(1.3.5) Determination of Correction Amount for Each Image Position

In the above-described schemes, the correction amount is determined based on the image height, but the present disclosure is not limited to the examples. For example, the imaging device 100 may determine the correction amount in accordance with a position in an image without being limited to the image height. For example, the imaging device 100 may generate a correction map in which a correction amount is different in upper left and right lower portion of an image even when the position of the image height is the same.

2. Conclusion

As described above, the embodiment of the present disclosure provides the imaging device 100 capable of correcting a variation in the in-plane depth in the depth map. By correcting the variation in the in-plane depth in the depth map, the imaging device 100 according to the embodiment of the present disclosure can determine that a subject at the same distance from the imaging element is at the same distance without depending on the image height, for example, when an application that obtains a distance using the value of the depth is performed.

3. Example of Application to Imaging Element

The technology according to the present disclosure (the present technology) can be applied to various products. For example, the technology according to the present disclosure may be realized as an imaging element.

Figure 33:
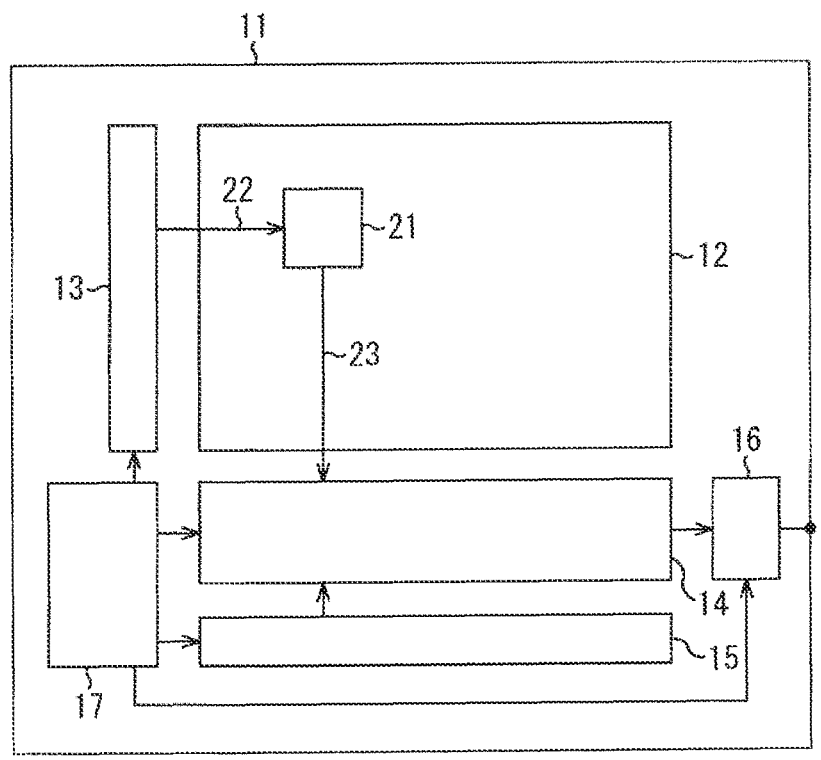
FIG. 33 is a block diagram illustrating an example of a configuration of an image element of an embodiment to which the technology according to the present disclosure is applied.

FIG. 33 is a block diagram illustrating an example of a configuration of an image element of an embodiment to which the technology according to the present disclosure is applied.

As illustrated in FIG. 33, the imaging element 11 is a CMOS solid-state imaging element and includes a pixel array unit 12, a vertical driving unit 13, a column processing unit 14, a horizontal driving unit 15, an output unit 16, and a driving control unit 17.

The pixel array unit 12 includes a plurality of pixels 21 disposed in an array form, is connected to the vertical driving unit 13 via a plurality of horizontal wirings 22 corresponding to the number of rows of the pixels 21, and is connected to the column processing unit 14 via a plurality of vertical wirings 23 corresponding to the number of columns of the pixels 21. That is, the plurality of pixels 21 of the pixel array unit 12 are disposed at points at which the horizontal wirings 22 and the vertical wirings 23 intersect with other.

The vertical driving unit 13 sequentially supplies driving signals (transmission signals, selection signals, reset signals, or the like) for driving the pixels 21 for each row of the plurality of pixels 21 of the pixel array unit 12 via the horizontal wirings 22.

The column processing unit 14 extracts a signal level of a pixel signal by applying correlated double sampling (CDS) processing to a pixel signal output from each pixel 21 via the vertical wiring 23 and acquires pixel data in accordance with an amount of received light of the pixel 21.

The horizontal driving unit 15 sequentially supplies driving signals for sequentially outputting pixel data acquired from the pixels 21 from the column processing unit 14 to the column processing unit 14 for each column of the plurality of pixels 21 of the pixel array unit 12.

The pixel data is supplied from the column processing unit 14 to the output unit 16 at a timing in accordance with a driving signal of the horizontal driving unit 15. For example, the output unit 16 amplifies the pixel data and outputs the pixel data to an image processing circuit in a subsequent stage.

The driving control unit 17 controls driving of each block inside the imaging element 11. For example, the driving control unit 17 generates a clock signal at a driving period of each block and supplies the clock signal to each block.

The example of the imaging element to which the technology of the present disclosure is applied has been described above. The imaging element 11 according to the present disclosure can be applied to the imaging element 112 in the configuration described in <1. Embodiment of present disclosure>. Then, it is possible to obtain a captured image which it is easier to view.

4. Example of Application to Moving Body

The technology according to the present disclosure (the present technology) can be applied to various products. For example, the technology of the present disclosure may be realized a device mounted on any type of moving body such as an automobile, an electric automobile, a hybrid electric automobile, a motorcycle, a bicycle, a personal mobility, an airplane, a drone, a ship, and a robot.

Figure 34:
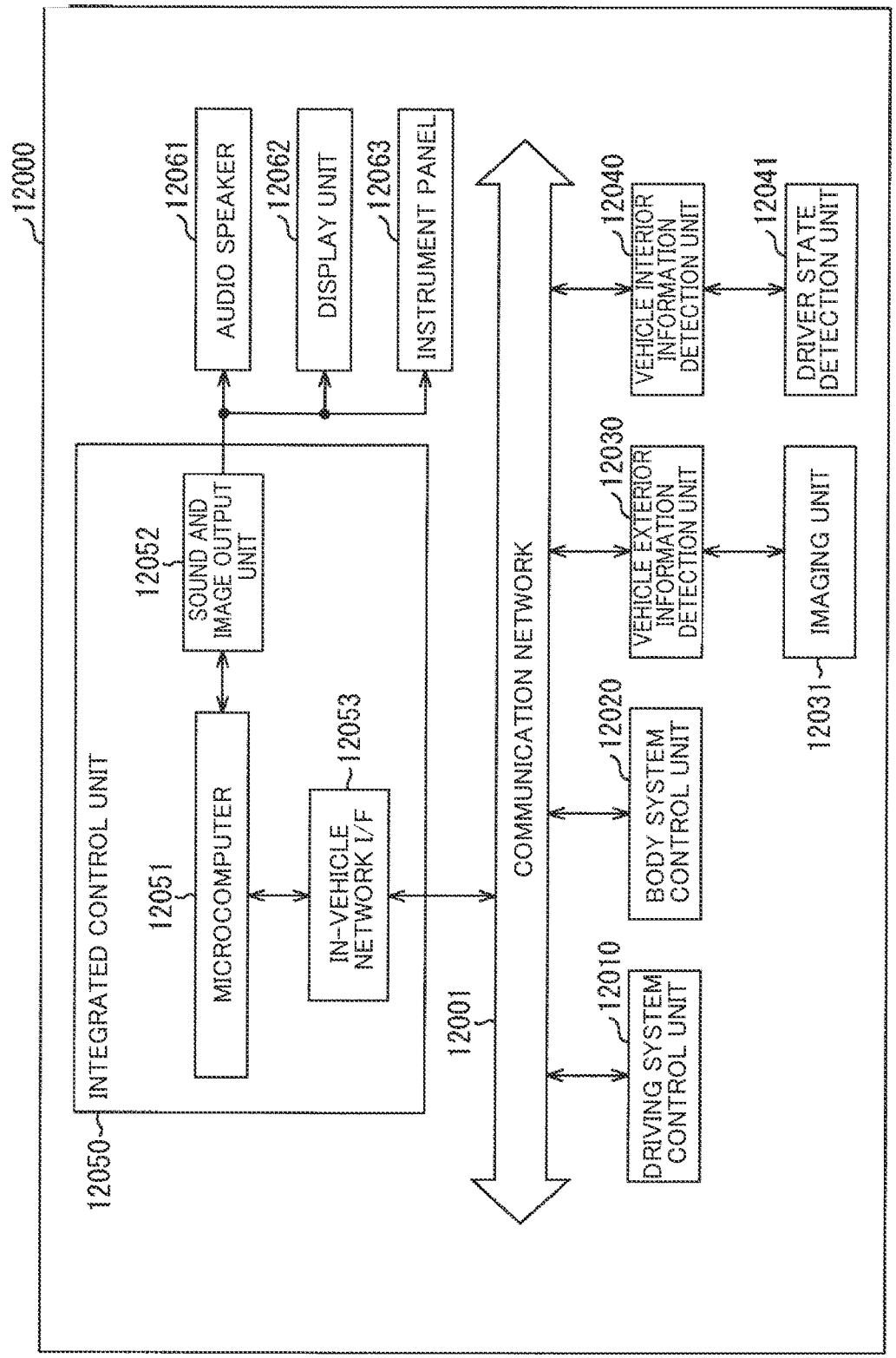
FIG. 34 is a block diagram illustrating an example of a schematic configuration of a vehicle control system which is an example of a moving body control system to which the technology according to the present disclosure is applied.

FIG. 34 is a block diagram illustrating an example of a schematic configuration of a vehicle control system which is an example of a moving body control system to which the technology according to the present disclosure can be applied.

A vehicle control system 12000 includes a plurality of electronic control units connected via a communication network 12001. In the example illustrated in FIG. 34, the vehicle control system 12000 includes a driving system control unit 12010, a body system control unit 12020, a vehicle exterior information detection unit 12030, a vehicle interior information detection unit 12040, and an integrated control unit 12050. As a functional configuration of the integrated control unit 12050, a microcomputer 12051, a sound and image output unit 12052, and an in-vehicle network interface (I/F) 12053 are illustrated.

The driving system control unit 12010 controls an operation of a device related to a driving system of a vehicle in accordance with various programs. For example, the driving system control unit 12010 functions as a control device such as a driving force generation device that generates a driving force of a vehicle, such as an internal combustion engine or a driving motor, a driving force transmission mechanism that transmits a driving force to wheels, a steering mechanism that adjusts a rudder angle of the vehicle, and a braking device that generates a braking force of the vehicle.

The body system control unit 12020 controls operations of various devices equipped in a vehicle body in accordance with various programs. For example, the body system control unit 12020 functions as a keyless entry system, a smart key system, a power window device, or a control device of various lamps such as a head lamp, a back lamp, a brake lamp, a turn signal, and a flog lamp. In this case, radio waves transmitted from a portable device with which a key is substituted or signals of various switches are input to the body system control unit 12020. The body system control unit 12020 receives an input of the radio waves or the signals and controls a door locking device, a power window device, lamps, and the like of the vehicle.

The vehicle exterior information detection unit 12030 detects external information of the vehicle on which the vehicle control system 12000 is mounted. For example, the imaging unit 12031 is connected to the vehicle exterior information detection unit 12030. The vehicle exterior information detection unit 12030 causes the imaging unit 12031 to capture vehicle exterior images and receives the captured images. Based on the received images, the vehicle exterior information detection unit 12030 may perform object detection processing or distance detection processing for people, vehicles, obstacles, signs, letters on road surfaces, and the like.

The imaging unit 12031 is an optical sensor that receives light and outputs an electric signal in accordance with an amount of received light. The imaging unit 12031 can output the electric signal as an image or can also output the electric signal as distance measurement information. The light received by the imaging unit 12031 may be visible light or may be invisible light such as infrared light.

The vehicle interior information detection unit 12040 detects vehicle interior information. For example, a driver state detection unit 12041 that detects a driver state is connected to the vehicle interior information detection unit 12040. The driver state detection unit 12041 includes, for example, a camera that images a driver. Based on detection information input from the driver state detection unit 12041, the vehicle interior information detection unit 12040 may calculate a fatigue degree or a concentration degree of the driver or may determine whether the driver is dozing.

The microcomputer 12051 can calculate a control target value of the driving force generation device, the steering mechanism, or the braking device based on information regarding the vehicle exterior and interior acquired by the vehicle exterior information detection unit 12030 or the vehicle interior information detection unit 12040, and can output a control instruction to the driving system control unit 12010. For example, the microcomputer 12051 can perform coordinated control for realizing an advanced driver assistance system (ADAS) function including vehicle collision avoidance, shock alleviation, following travel based on an inter-vehicle distance, vehicle speed maintenance travel, a vehicle collision warning, or a vehicle lane deviation warning.

The microcomputer 12051 can perform coordinated control for automated driving or the like in which autonomous travel is performed without an operation of a driver by controlling the driving force generation device, the steering mechanism, the braking device, and the like based on information regarding the vicinity of the vehicle acquired by the vehicle exterior information detection unit 12030 or the vehicle interior information detection unit 12040.

The microcomputer 12051 can output a control instruction to the body system control unit 12020 based on information regarding the vehicle exterior acquired by the vehicle exterior information detection unit 12030. For example, the microcomputer 12051 can perform coordinated control for achieving antidazzle such as switching of a high beam to a low beam by controlling the head lamp in accordance with a position of a front vehicle or an oncoming vehicle detected by the vehicle exterior information detection unit 12030.

The sound and image output unit 12052 transmits an output signal of at least one of a sound and an image to an output device capable of notifying an occupant of the vehicle or the vehicle exterior of information visually or auditorily. In the example of FIG. 34, an audio speaker 12061, a display unit 12062, and an instrument panel 12063 are exemplified as the output device. The display unit 12062 may include for example, at least one of an onboard display and a head-up display.

Figure 35:
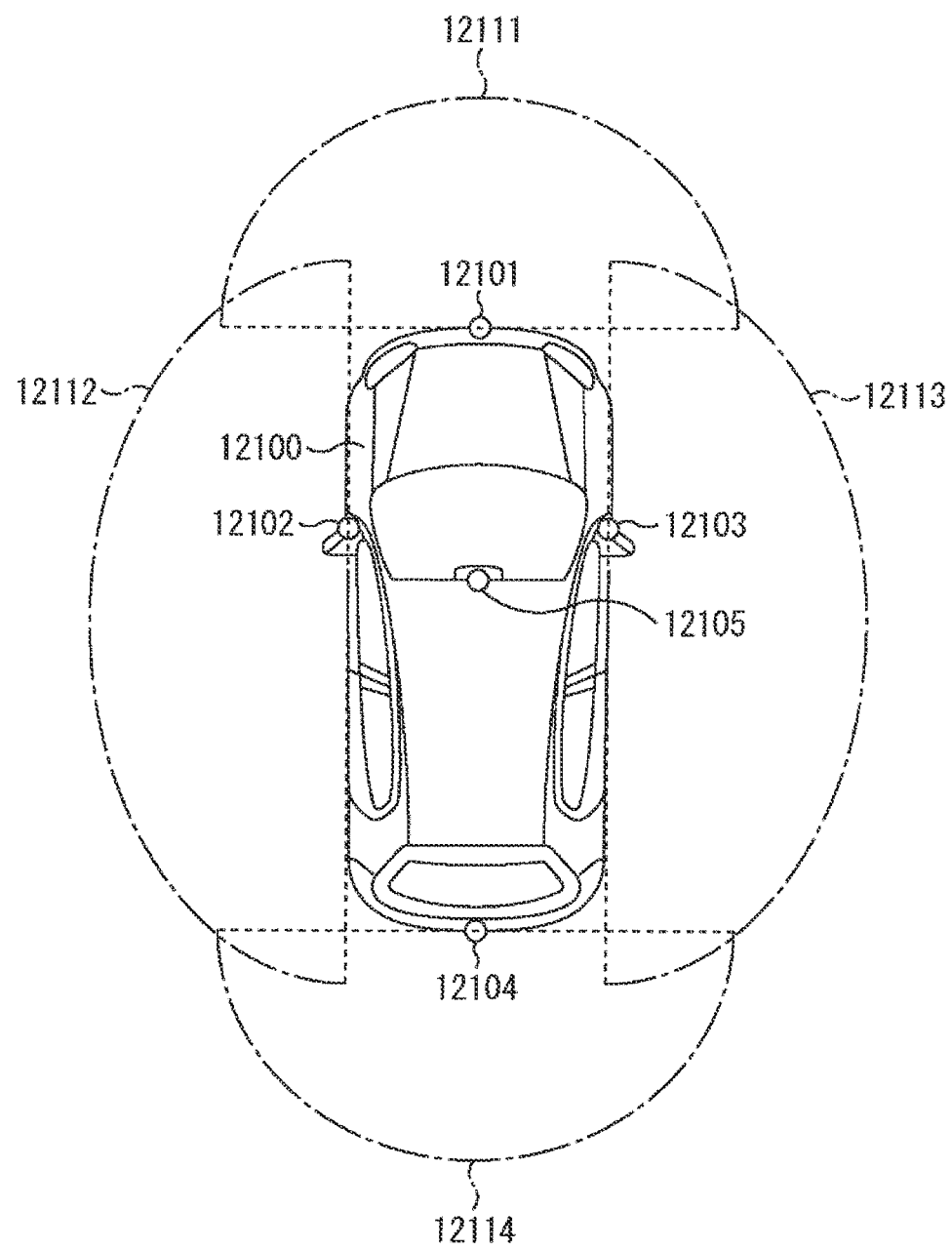
FIG. 35 is a diagram illustrating an example of a position at which an imaging unit is installed.

FIG. 35 is a diagram illustrating an example of a position at which the imaging unit 12031 is installed.

In FIG. 35, a vehicle 12100 includes imaging units 12101, 12102, 12103, 12104, and 12105 as the imaging unit 12031.

The imaging units 12101, 12102, 12103, 12104, and 12105 are provided, for example, at positions such as a front nose, side mirrors, a rear bumper, a backdoor, and an upper portion of a front glass of the vehicle interior of the vehicle 12100. The imaging unit 12101 provided in the front nose and the imaging unit 12105 provided in the upper portion of the front glass inside the vehicle mainly acquire images on the front side of the vehicle 12100. The imaging units 12102 and 12103 provided in the side mirrors mainly acquire images on the lateral sides of the vehicle 12100. The imaging unit 12104 provided in the rear bumper or the backdoor mainly acquires images on the rear side of the vehicle 12100. The images on the front side acquired by the imaging units 12101 and 12105 are mainly used to detect front vehicles or pedestrians, obstacles, traffic signals, traffic signs, lanes, and the like.

FIG. 35 illustrates an example of imaging ranges of the imaging units 12101 to 12104. An imaging range 12111 is an imaging range of the imaging unit 12101 provided in the front nose, imaging ranges 12112 and 12113 are imaging ranges of the imaging unit 12102 and 12103 provided in the side mirrors, and an imaging range 12114 is an imaging range of the imaging unit 12104 provided in the rear bumper or the backdoor. For example, by superimposing the image data captured by the imaging units 12101 to 12104, it is possible to obtain a bird's eye view image in which the vehicle 12100 is viewed from the upper side.

At least one of the imaging units 12101 to 12104 may have a function of acquiring distance information. For example, at least one of the imaging units 12101 to 12104 may be a stereo camera including a plurality of imaging elements or may be an imaging element that has pixels for phase difference detection.

For example, the microcomputer 12051 can extract a three-dimensional object traveling at a predetermined speed (for example, 0 km/h or more) in substantially the same direction as that of the vehicle 12100 which is particularly a closest three-dimensional object on a travel road of the vehicle 12100 as a front vehicle by obtaining a distance from each three-dimensional object within the imaging ranges 12111 to 12114 and a temporal change of the distance (a relative speed to the vehicle 12100) based on the distance information obtained from the imaging units 12101 to 12104. Further, the microcomputer 12051 can set an inter-vehicle distance which is guaranteed in advance before a front vehicle and perform automated brake control (also including following stop control) or automated acceleration control (also including following start control). In this way, it is possible to perform the coordinated control for automated driving or the like in which autonomous travel is performed without an operation of a driver.

For example, the microcomputer 12051 can classify and extract three-dimensional object data regarding three-dimensional objects into motorcycles, normal vehicles, large vehicles, pedestrians, electric poles, and the like into other three-dimensional objects based on the distance information obtained from the imaging units 12101 to 12104, and can use the three-dimensional objects for automatic avoidance of obstacles. For example, the microcomputer 12051 identifies obstacles around the vehicle 12100 as obstacles which can be recognized by the driver of the vehicle 12100 and obstacles which it is difficult to recognize. Then, the microcomputer 12051 determines a collision risk indicating a risk of collision with each obstacle. In a situation in which there is a possibility of collision at which the collision risk is equal to or greater than a set value, driving support for collision avoidance can be performed by outputting a warning to the driver via the audio speaker 12061 or the display unit 12062 or performing forced deceleration or avoidance steering via the driving system control unit 12010.

At least one of the imaging units 12101 to 12104 may be an infrared camera that detects infrared light. For example, the microcomputer 12051 can recognize pedestrians by determining whether there are the pedestrians in images captured by the imaging units 12101 to 12104. The pedestrians are recognized, for example, in an order in which feature points in the images captured by the imaging units 12101 to 12104 serving as infrared cameras are extracted and an order in which pattern matching processing is on a series of feature points indicating the contour of an object to determine whether there is a pedestrian. When the microcomputer 12051 determines that there is the pedestrian in the images captured by the imaging units 12101 to 12104 and recognizes the pedestrian, the sound and image output unit 12052 controls the display unit 12062 such that a rectangular contour line for emphasizing the recognized pedestrian is superimposed and displayed. The sound and image output unit 12052 may control the display unit 12062 such that an icon or the like indicating the pedestrian is displayed at a desired position.

The example of the vehicle control system to which the technology according to the present disclosure is applied has been described above. The technology according to the present disclosure can be applied to the imaging unit 12031 and the like in the above-described configuration. For example, the imaging device 100 (the imaging element 112 and the image processing unit 120) illustrated in FIG. 9 can be applied to the imaging unit 12031. By applying the technology according to the present disclosure to the imaging unit 12031, it is possible to obtain a captured image which it is easier to view. Therefore, it is possible to reduce the fatigue of the driver.

5. Example of Application to Endoscope Surgery System

The technology according to the present disclosure (the present technology) can be applied to various products. For example, the technology according to the present disclosure may be applied to an endoscope surgery system.

Figure 36:
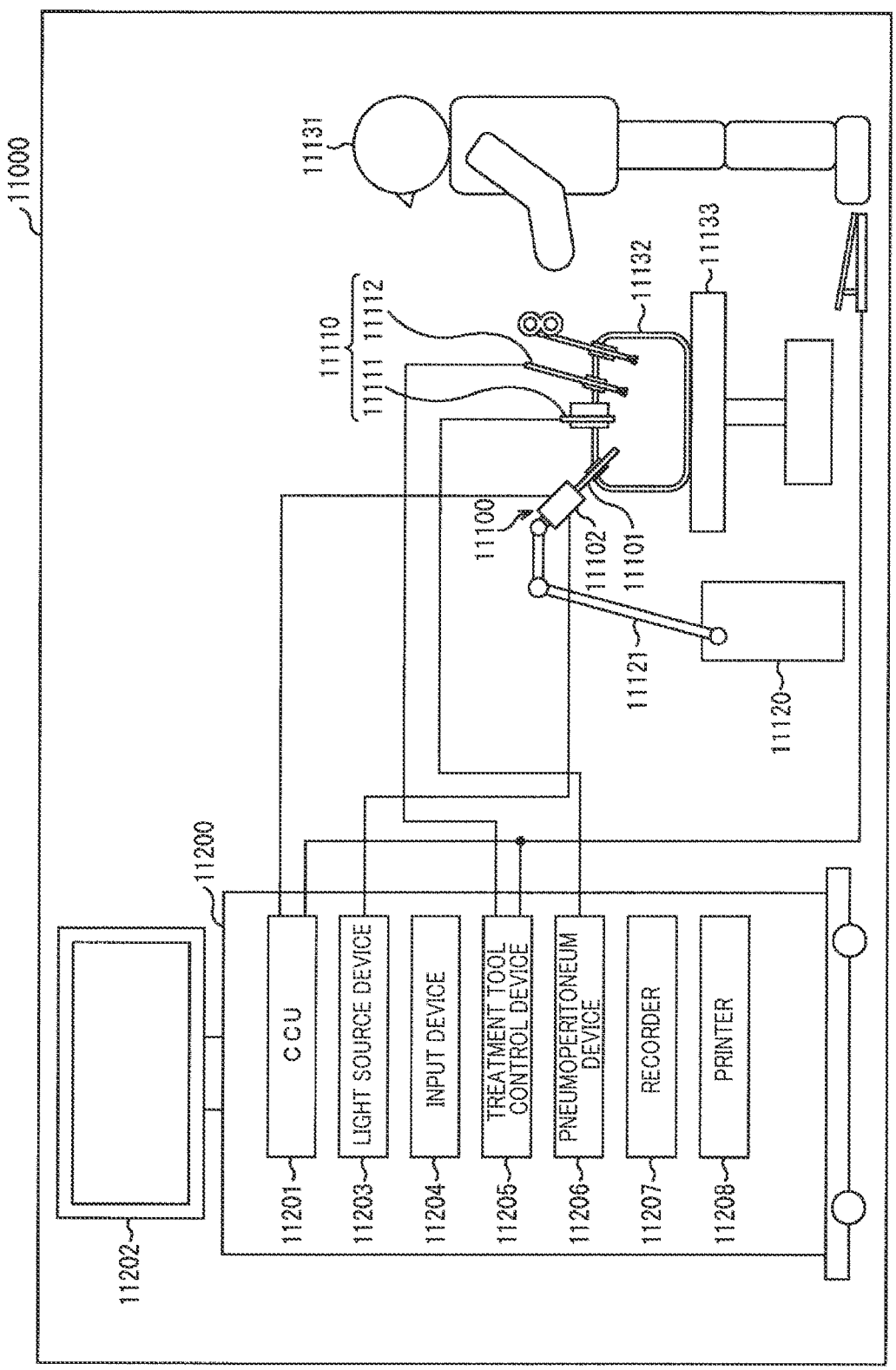
FIG. 36 is a diagram illustrating an example of a schematic configuration of an endoscope surgery system to which the technology according to the present disclosure is applied.

FIG. 36 is a diagram illustrating an example of a schematic configuration of an endoscope surgery system to which the technology according to the present disclosure is applied.

FIG. 36 illustrates an aspect in which an operator (a physician) 11131 is performing an operation on a patient 11132 on a patient bed 11133 using an endoscope surgery system 11000. As illustrated, the endoscope surgery system 11000 includes an endoscope 11100, other surgery tools 11110 such as a pneumoperitoneum tube 11111 or an energy treatment tool 11112, a support arm device 11120 supporting the endoscope 11100, and a cart 11200 on which various devices for an endoscopic operation are mounted.

The endoscope 11100 includes a body tube 11101 of which a region with a predetermined length is inserted from a distal end into a body cavity of the patient 11132 and a camera head 11102 connected to a base end of the body tube 11101. In the illustrated example, the endoscope 11100 configured as a so-called hard mirror having a hard body tube 11101 is illustrated, but the endoscope 11100 may be configured as a so-called soft mirror having a soft body tube.

At the distal end of the body tube 11101, an opening into which an objective lens is inserted is provided. A light source device 11203 is connected to the endoscope 11100, light generated by the light source device 11203 is guided to the distal end of the body tube by a light guide extended to the inside of the body tube 11101, and the light is radiated to an observation target in the cavity of the patient 11132 through the objective lens. The endoscope 11100 may be a direct-viewing mirror, an oblique-viewing mirror, or a side-viewing mirror.

An optical system and an imaging element are provided inside the camera head 11102 and light (observation light) reflected from the observation target is condensed on the imaging element by the optical system. The observation light is photoelectrically converted by the imaging element and an electric signal corresponding to the observation light, that is, an image signal corresponding to an observation image, is generated. The image signal is transmitted as raw data to a camera control unit (CCU) 11201.

The CCU 11201 is configured by a central processing unit (CPU), a graphics processing unit (GPU), or the like and generally controls operations of the endoscope 11100 and the display device 11202. Further, the CCU 11201 receives an image signal from the camera head 11102 and performs, for example, various kinds of image processing such as developing processing (demosaic processing) on the image signal to display an image based on the image signal.

The display device 11202 displays the image based on the image signal subjected to the image processing in the CCU 11201 under the control of the CCU 11201.

The light source device 11203 is configured by, for example, a light source such as a light-emitting diode (LED) and supplies the endoscope 11100 with irradiation light at the time of imaging of an operation part or the like.

An input device 11204 is an input interface to the endoscope surgery system 11000. A user can input various kinds of information or instructions to the endoscope surgery system 11000 via the input device 11204. For example, the user inputs an instruction or the like to change imaging conditions (a kind of irradiation light, a magnification, a focal distance, and the like) for the endoscope 11100.

A treatment tool control device 11205 controls driving of the energy treatment tool 11112 for tissue cautery or incision, blood vessel sealing, or the like. A pneumoperitoneum device 11206 sends a gas into the cavity via the pneumoperitoneum tube 11111 to inflate the cavity of the patient 11132 in order to guarantee a visual field for the endoscope 11100 and guarantee a working space of the operator. A recorder 11207 is a device capable of recording various kinds of information regarding surgery. A printer 11208 is a device capable of printing various kinds of information regarding surgery in various forms of text, images, graphs, or the like.

The light source device 11203 that supplies the endoscope 11100 with irradiation light at the time of imaging of an operation part can be configured by, for example, an LED, a laser light source, or a white light source configured in combination thereof. When the white light source is configured in combination of an RGB laser light source, an output intensity and an output timing of each color (each wavelength) can be controlled with high accuracy. Therefore, the light source device 11203 can adjust white balance of a captured image. In this case, by irradiating an observation target with laser light from the RGB laser light source chronologically and controlling driving of the imaging element of the camera head 11102 in synchronization with the irradiation timing, it is also possible to capture images corresponding to RGB chronologically. According to this method, it is possible to obtain a color image even when color filters are not provided in the imaging element.

The driving of the light source device 11203 may be controlled such that the intensity of light to be output is changed at each predetermined time. By controlling the driving of the imaging element of the camera head 11102 in synchronization with a change timing of the intensity of the light, acquiring images chronologically, and combining the images, it is possible to generate an image with a high dynamic range in which there is no so-called black spots and white spots.

The light source device 11203 may be configured to be able to supply light with a predetermined wavelength band corresponding to special light observation. In the special light observation, for example, so-called narrow band observation (narrow band imaging) is performed for imaging a predetermined tissue such as a blood vessel of a mucous membrane surface with high contrast by radiating light with a narrower band than the irradiation light (that is, white light) at the time of normal observation using wavelength dependency of light absorption in a body tissue. Alternatively, in the special light observation, fluorescence observation may be performed for obtaining an image by fluorescence occurring by radiating exciting light. In the fluorescence observation, for example, a body tissue can be irradiated with exciting light and fluorescence from the body tissue can be observed (self-fluorescence observation), or a reagent such as indocyanine green (ICG) can be locally injected into a body tissue and the body tissue can be irradiated with exciting light corresponding to the fluorescence wavelength of the reagent to obtain a fluorescent image. The light source device 11203 can be configured to be able to supply exciting light and/or narrow-band light corresponding to the special light observation.

Figure 37:
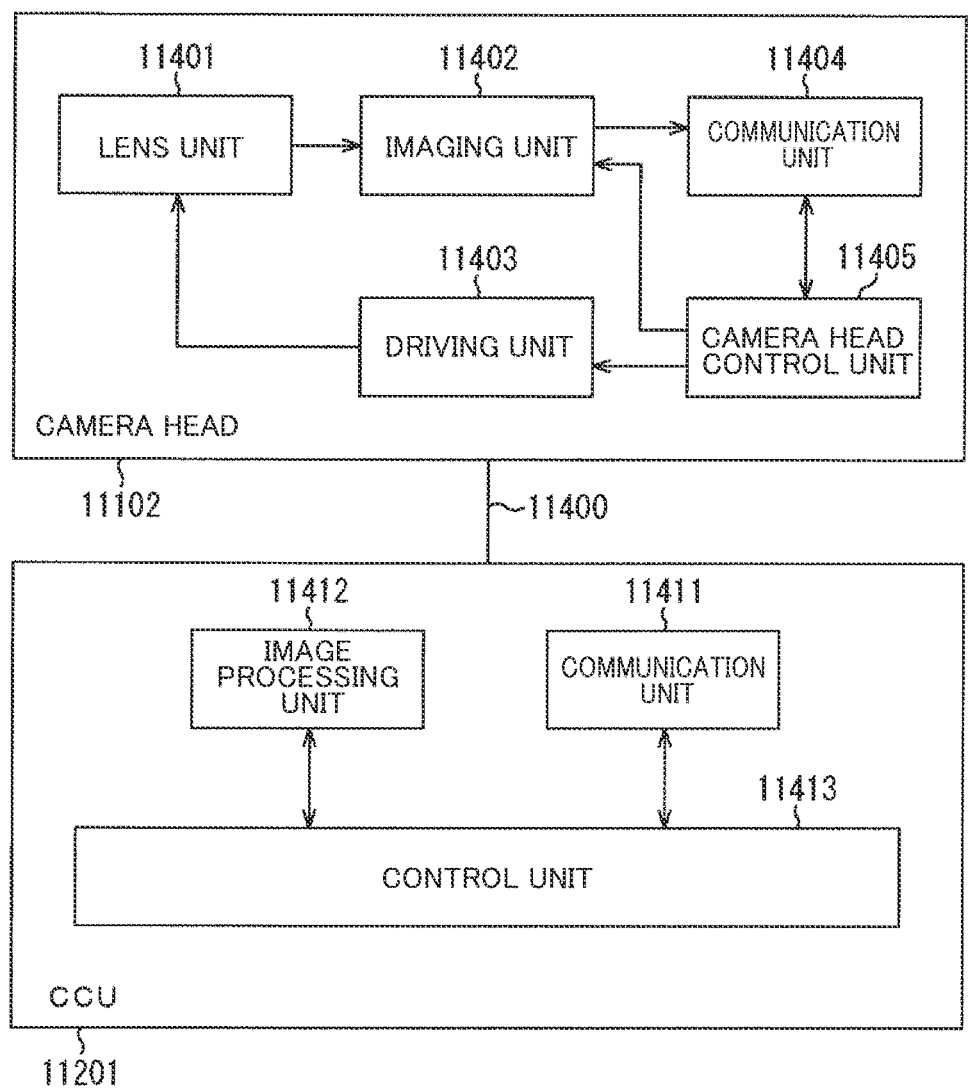
FIG. 37 is a block diagram illustrating examples of functional configurations of a camera head and a CCU illustrated in FIG. 36.

FIG. 37 is a block diagram illustrating examples of functional configurations of the camera head 11102 and the CCU 11201 illustrated in FIG. 36.

The camera head 11102 includes a lens unit 11401, an imaging unit 11402, a driving unit 11403, a communication unit 11404, and a camera head control unit 11405. The CCU 11201 includes a communication unit 11411, an image processing unit 11412, and a control unit 11413. The camera head 11102 and the CCU 11201 are connected to be able to communicate with each other via a transmission cable 11400.

The lens unit 11401 is an optical system provided in a connection unit with the body tube 11101. Observation light received from the distal end of the body tube 11101 is guided to the camera head 11102 and is incident on the lens unit 11401. The lens unit 11401 is configured to a plurality of lenses including a zoom lens and a focus lens in combination.

The imaging unit 11402 is configured as an imaging element. The number of imaging elements that configure the imaging unit 11402 may be one (so-called single-plate) or may be multiple (so-called multiple-plate). When the imaging unit 11402 is configured as a multiple-plate, for example, an image signal corresponding to each of RGB may be generated by each imaging element and a color image may be able to be generated by combining the image signals. Alternatively, the imaging unit 11402 may include one imaging element to acquire a pair of imaging elements of right-eye and left-eye image signals corresponding to three-dimensional (3D) display. By performing the 3D display, the operator 11131 can ascertain the depth of a body tissue in an operation part more accurately. When the imaging unit 11402 is configured as a multiple-plate, a plurality of lens units 11401 may be provided to correspond to each imaging element.

The imaging unit 11402 may not necessarily be provided in the camera head 11102. For example, the imaging unit 11402 may be provided immediately after the objective lens inside the body tube 11101.

The driving unit 11403 is configured by an actuator and the zoom lens and the focus lens of the lens unit 11401 are moved by a predetermined distance along an optical axis under the control of the camera head control unit 11405. In this way, it is possible to appropriately adjust the magnification and focus of a captured image by the imaging unit 11402.

The communication unit 11404 is configured by a communication device that transmits and receives various kinds of information to and from the CCU 11201. The communication unit 11404 transmits an image signal obtained from the imaging unit 11402 to the CCU 11201 as raw data via the transmission cable 11400.

The communication unit 11404 receives a control signal for controlling driving of the camera head 11102 from the CCU 11201 and supplies the control signal to the camera head control unit 11405. The control signal includes, for example, information regarding imaging conditions such as information indicating designation of a frame rate of a captured image, information indicating designation of an exposure value at the time of imaging, and/or information indicating designation of the magnification and focus of the captured image.

Imaging conditions such as the foregoing frame rate, exposure value, magnification, and focus may be designated appropriately by the user or may be set automatically by the control unit 11413 of the CCU 11201 based on the acquired image signal. In the latter case, a so-called auto exposure (AE), auto focus (AF) function, and auto white balance (AWB) function are mounted on the endoscope 11100.

The camera head control unit 11405 controls driving of the camera head 11102 based on a control signal received from the CCU 11201 via the communication unit 11404.

The communication unit 11411 is configured by a communication device that transmits and receives various kinds of information to and from the camera head 11102. The communication unit 11411 receives an image signal transmitted via the transmission cable 11400 from the camera head 11102.

The communication unit 11411 transmits a control signal for controlling driving of the camera head 11102 to the camera head 11102. The image signal or the control signal can be transmitted through electric communication, optical communication, or the like.

The image processing unit 11412 applies various kinds of image processing to the image signal which is the raw data transmitted from the camera head 11102.

The control unit 11413 performs various kinds of control on display of a captured image obtained through imaging of an operation part or imaging of an operation part or the like by the endoscope 11100. For example, the control unit 11413 generates a control signal for controlling driving of the camera head 11102.

The control unit 11413 causes the display device 11202 to display the captured image in which the operation part or the like is shown based on the image signal subjected to the image processing in the image processing unit 11412. At this time, the control unit 11413 may recognize various objects in the captured image using various image recognition technologies. For example, the control unit 11413 can recognize a surgery tool such as forceps, a specific biological part, bleeding, or mist or the like at the time of use of the energy treatment tool 11112 by detecting the shape, color, or the like of the edge of an object included in the captured image. The control unit 11413 may superimpose various kinds of surgery support information on the image of the operation part for display using the recognition result when the display device 11202 is caused to display the captured image. By superimposing and displaying the surgery support information and presenting the surgery support information to the operator 11131, it is possible to reduce a burden on the operator 11131 or allow the operator 11131 to perform an operation reliably.

The transmission cable 11400 connecting the camera head 11102 to the CCU 11201 is an electric signal cable corresponding to communication of an electric signal, an optical fiber corresponding to optical communication, or a composite cable thereof.

Here, in the illustrated example, the transmission cable 11400 is used for wired communication, but communication between the camera head 11102 and the CCU 11201 may be performed wirelessly.

The example of the endoscope surgery system to which the technology of the present disclosure can be applied has been described above. The technology according to the present disclosure can be applied to the endoscope 11100, the imaging unit 11402 of the camera head 11102, the image processing unit 11412 of the CCU 11201, and the like. For example, the imaging device 100 (the imaging element 112 and the image processing unit 120) illustrated in FIG. 9 can be applied to the endoscope 11100, the imaging unit 11402, the image processing unit 11412, and the like in the above-described configuration. By applying the technology of the present disclosure to the endoscope 11100, the imaging unit 11402, the image processing unit 11412, and the like, it is possible to obtain a clearer surgery image. Therefore, the operator can reliably ascertain an operation part.

Here, the endoscope surgery system has been described as an example, but the technology according to the present disclosure may be applied to others, for example, a microscope surgery system.

The steps in the processing performed by each device of the present specification may not necessarily be processed chronologically in the order described in the sequence figures and the flowcharts. For example, the steps in the processing performed by each device may be processed in a different order from the order described in the flowchart or may be processed in parallel.

A computer program causing hardware such as a CPU, a ROM, and a RAM embedded in each device to exert the same function as the configuration of each of the above-described devices. A storage medium that stores the computer program can also be provided. By configuring each functional block illustrated in the functional block figure using hardware, the series of processing can be realized by the hardware.

The preferred embodiments of the present disclosure have been described in detail with reference to the appended drawings, but the technical range of the present disclosure is not limited to the examples. It is apparent to those skilled in the art in the technical field of the present disclosure that various changes or corrections can be made within the scope of the technical spirit and essence described in the claims and these changes and corrections are, of course, construed to pertain to the technical scope of the present disclosure.

The advantageous effects described in the present specification are merely explanatory or exemplary and are not limited. That is, in the technology according to the present disclosure, other advantageous effects apparent to those skilled in the art can be obtained from the description of the present specification in addition to or instead of the foregoing advantageous effects.

The following configurations belong to the technical scope of the present disclosure.

(1)

An imaging device including:

an imaging element including a pixel capable of detecting a depth;

an image processing unit configured to detect a depth using a signal obtained from the pixel and perform processing based on the depth; and a correction data generation unit configured to generate, based on the signal, correction data for correcting image height dependency of the depth in the image processing unit.

(2)

The imaging device according to (1), in which the image processing unit corrects the image height dependency of the depth by applying the correction data when the depth is detected.

(3)

The imaging device according to (1), in which the image processing unit corrects the image height dependency of the depth by applying the correction data when the processing based on the depth is performed.

(4)

The imaging device according to (1), in which the image processing unit corrects the image height dependency of the depth by applying the correction data to the signal.

(5)

The imaging device according to any one of (1) to (4), in which the correction data generation unit generates the correction data by calculating a relation between a position of a lens and the depth at all image height positions based on information regarding the depth acquired while changing the position of the lens at which a subject image is formed on the imaging element.

(6)

The imaging device according to any one of (1) to (4), in which the correction data generation unit generates the correction data by calculating a relation between a distance between the depth and a subject and the imaging element at all image height positions based on information regarding a depth acquired while changing the distance.

(7)

The imaging device according to any one of (1) to (4), in which the correction data generation unit generates the correction data in which an offset shift amount of a depth from an image height serving as a reference is maintained based on information regarding a depth acquired by imaging a predetermined subject in a state in which a distance between the predetermined subject and the imaging element is fixed.

(8)

The imaging device according to any one of (1) to (4), in which the correction data generation unit generates the correction data based on information regarding an actual depth and information regarding a depth obtained by a simulation using design data of a lens forming a subject image on the imaging element.

(9) A correction method comprising: using a processor,
detecting a depth using a signal obtained from an imaging element including a pixel capable of detecting a depth and performing processing based on the depth; and
generating correction data for correcting image height dependency of the detected depth based on the signal.

(10) A computer program causing a computer to perform:
detecting a depth using a signal obtained from an imaging element including a pixel capable of detecting a depth and performing processing based on the depth; and
generating correction data for correcting image height dependency of the detected depth based on the signal.

REFERENCE SIGNS LIST

100 Imaging device
120 Image processing unit

The invention claimed is:

1. An imaging device, comprising:
an imaging element including a pixel capable of detecting a depth; and
a processor configured to:
  detect a depth using a signal obtained from the pixel and perform processing based on the depth; and
  generate, based on the signal, correction data for correcting image height dependency of the depth, wherein the image height dependency of the depth is corrected based on application of the corrected data when the depth is detected.

2. The imaging device according to claim 1, wherein the processor is further configured to correct the image height dependency of the depth based on application of the correction data when the processing based on the depth is performed.

3. The imaging device according to claim 1, wherein the processor is further configured to correct the image height dependency of the depth based on application of the correction data to the signal.

4. The imaging device according to claim 1, wherein the processor is further configured to generate the correction data based on calculation of a relation between a position of a lens and the depth at all image height positions based on information regarding the depth acquired while changing the position of the lens at which a subject image is formed on the imaging element.

5. The imaging device according to claim 1, wherein the processor is further configured to generate the correction data based on calculation of a relation between a distance between the depth and a subject and the imaging element at all image height positions based on information regarding a depth acquired while changing the distance.

6. The imaging device according to claim 1, wherein the processor is further configured to generate the correction data in which an offset shift amount of a depth from an image height serving as a reference is maintained based on information regarding a depth acquired by imaging a specific subject in a state in which a distance between the specific subject and the imaging element is fixed.

7. The imaging device according to claim 1, wherein the processor is further configured to generate the correction data based on information regarding an actual depth and information regarding a depth obtained by a simulation using design data of a lens forming a subject image on the imaging element.

8. A correction method, comprising:
detecting, by a processor, a depth using a signal obtained from an imaging element including a pixel capable of detecting a depth and performing processing based on the depth; and
generating, by the processor, correction data for correcting image height dependency of the detected depth based on the signal, wherein the image height dependency of the depth is corrected based on application of the corrected data when the depth is detected.

9. A non-transitory computer-readable medium having stored thereon, computer-executable instructions which, when executed by a computer, cause the computer to execute operations, the operations comprising:
detecting a depth using a signal obtained from an imaging element including a pixel capable of detecting a depth and performing processing based on the depth; and
generating correction data for correcting image height dependency of the detected depth based on the signal, wherein the image height dependency of the depth is corrected based on application of the corrected data when the depth is detected.

* * * * *